(12) United States Patent
Malhotra et al.

(10) Patent No.: US 10,044,623 B2
(45) Date of Patent: Aug. 7, 2018

(54) METHODS AND SYSTEMS FOR EFFICIENT ROUTING OF MULTICAST MEDIA CONTENT BY DATA ROUTERS AT END USER PREMISES

(71) Applicant: Verizon Patent and Licensing Inc., Arlington, VA (US)

(72) Inventors: Punitma Malhotra, San Jose, CA (US); Michael Talbert, Nazareth, PA (US); Kevin M. Foster, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 290 days.

(21) Appl. No.: 15/001,062

(22) Filed: Jan. 19, 2016

(65) Prior Publication Data
US 2017/0208007 A1 Jul. 20, 2017

(51) Int. Cl.
G06F 15/16 (2006.01)
H04L 12/801 (2013.01)
H04L 29/06 (2006.01)

(52) U.S. Cl.
CPC .......... H04L 47/15 (2013.01); H04L 65/4076 (2013.01)

(58) Field of Classification Search
USPC ................ 709/217, 219, 223, 225, 226, 229
See application file for complete search history.

(56) References Cited

U.S. PATENT DOCUMENTS

| | | | | |
|---|---|---|---|---|
| 6,477,522 B1 * | 11/2002 | Young | .................... | G06F 9/5044 |
| 9,253,229 B1 * | 2/2016 | Strothmann | ....... | H04N 21/2662 |
| 9,661,045 B2 * | 5/2017 | Labrozzi | ............. | H04L 65/4092 |
| 2004/0131340 A1 * | 7/2004 | Antoun | ................ | G11B 27/034 386/262 |
| 2008/0019388 A1 * | 1/2008 | Harmon | .................. | H04L 45/00 370/412 |
| 2008/0222235 A1 * | 9/2008 | Hurst | ................. | H04N 7/17336 709/201 |
| 2010/0046529 A1 * | 2/2010 | Roberts | .................... | H04L 47/10 370/401 |
| 2010/0106851 A1 * | 4/2010 | Aoki | ....................... | H04L 45/00 709/231 |
| 2013/0216212 A1 * | 8/2013 | Hurst | ..................... | H04L 65/80 386/353 |

* cited by examiner

*Primary Examiner* — Liangche A Wang

(57) ABSTRACT

An exemplary data router may receive from a client device a request to access a multicast packet stream corresponding to a media content channel. The data router may access the multicast packet stream, which may include a plurality of bit rate profiles each including a plurality of data packets representing a component of the media content channel transferred at a particular bit rate. The data router may filter out data packets included within bit rate profiles that have data transferred at a bit rate that is not a preferred or requested bit rate by the client device. The data router may also replace a multicast destination address with a device destination address in the data packets that are not filtered out. The data router may then route the modified multicast packet stream to the client device at the device destination address. Corresponding systems and methods are also described.

20 Claims, 13 Drawing Sheets

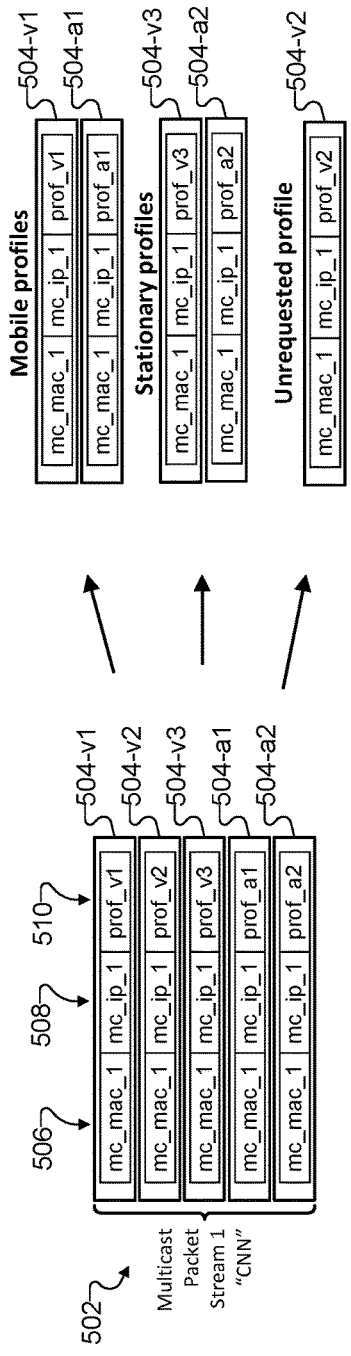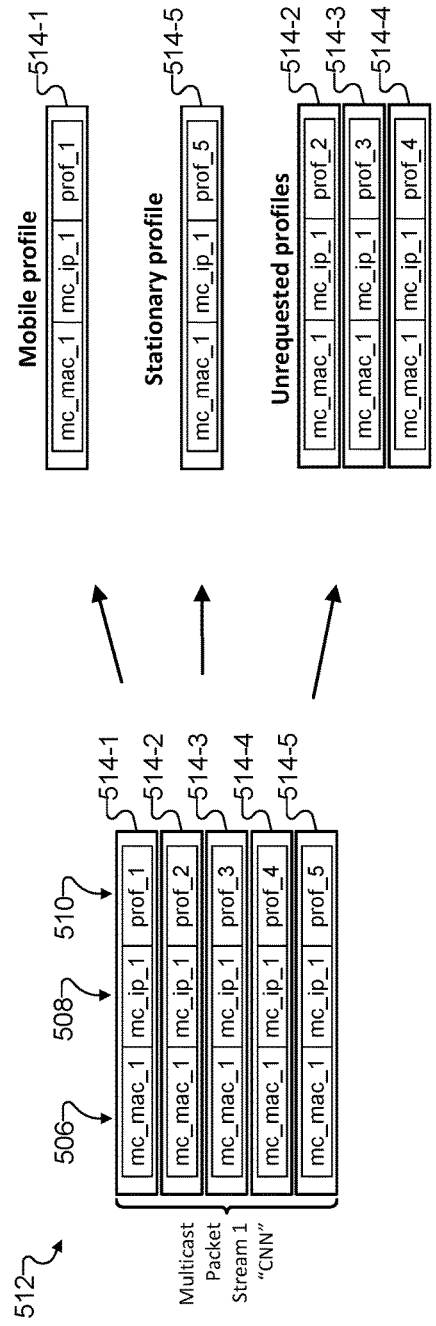
Fig. 5A
Fig. 5B

METHODS AND SYSTEMS FOR EFFICIENT ROUTING OF MULTICAST MEDIA CONTENT BY DATA ROUTERS AT END USER PREMISES

BACKGROUND INFORMATION

Media content providers (e.g., cable television providers, satellite television and radio providers, Internet service providers, etc.) often provide digital video, audio, and/or other media content to client devices of end users such as subscribers of the media content providers' services. Commonly, digital media content is provided by way of Internet infrastructure and protocols that are in place. For example, access to media content specifically requested by a client device associated with a subscriber may be provided by a media content provider system to the client device of the subscriber using a unicast packet stream including packets adhering to link layer protocols (e.g., Media Access Control ("MAC") such as Ethernet), Internet layer protocols (e.g., Internet Protocol ("IP")), transport layer protocols (e.g., Transmission Control Protocol ("TCP") or User Datagram Protocol ("UDP")), and/or other standards and protocols known in the art.

In certain examples, a plurality of client devices associated with a plurality of end users may request access to the same media content at the same time. For example, media content providers may offer media content channels (e.g., local television channels, network television channels, Internet television channels, cable and satellite television channels, Internet and satellite radio stations, pay-per-view programs, video conferences, etc.) that multiple end users may wish to view or listen to at the same time. In these examples, rather than transmitting a separate unicast packet stream to each individual end user requesting access to the same media content channel, media content provider systems may conserve computing resources by using protocols and standards for transmitting a single multicast packet stream that each client device can access. However, while use of multicast packet streams may generate large-scale efficiencies for transmitting media content by media content provider systems, the multicast packet streams may fail to address, or may even cause, other inefficiencies that occur when multicast packet streams are routed to client devices at end user premises (e.g., homes, offices, etc.) by data routers associated with local area networks at the end user premises.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5A-5B illustrate exemplary multicast packet streams that correspond to media content channels and include exemplary data packets associated with exemplary bit rate profiles of the media content channels according to principles described herein.

DETAILED DESCRIPTION OF PREFERRED EMBODIMENTS

Figure 1:
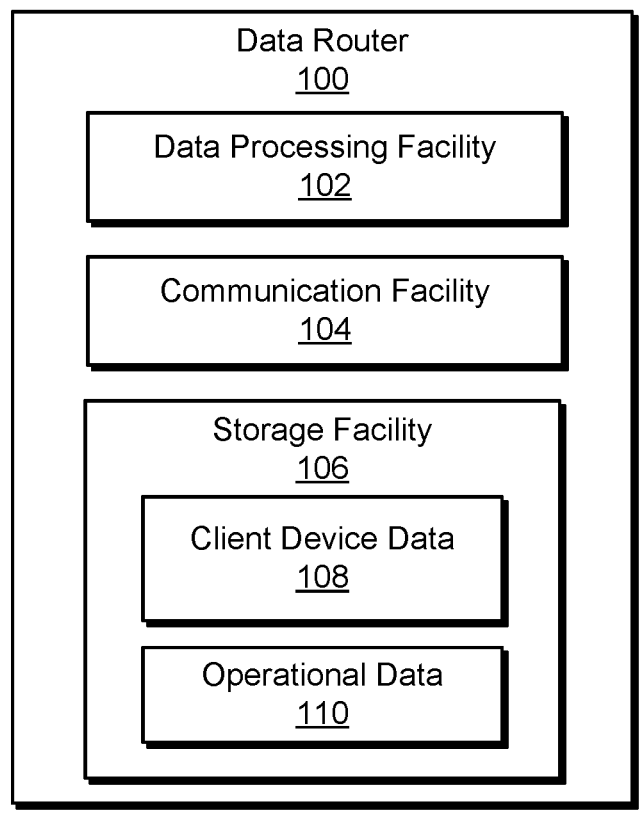
FIG. 1 illustrates an exemplary data router configured to provide efficient routing of multicast media content at an end user premises according to principles described herein.

Methods and systems for efficient routing of multicast media content by data routers at end user premises are described herein. As will be illustrated below, a media content provider system may distribute multicast media content to various end users (e.g., subscribers associated with a media content provider service) by way of multicast packet streams corresponding to media content channels such as television channels and/or radio stations. Each end user may be associated with a client device (e.g., a television or a set-top box associated with the television, a mobile device, etc.), which may be communicatively coupled to a data router by a local area network at the end user premises (e.g., a home network, an office intranet, etc.) and which the end user may use to view and/or listen to media content.

In certain examples, a data router located at an end user premises may receive a request (e.g., from a client device or directly from an end user) to access a multicast packet stream corresponding to a media content channel and, in response, may access the multicast packet stream corresponding to the media content channel. The multicast packet stream may include a first plurality of data packets associated with a first bit rate profile of the media content channel and a second plurality of data packets associated with a second bit rate profile of the media content channel. The first plurality of data packets may include data representing a component (e.g., a video component, an audio component, a trick play component, etc.) of the media content channel transferred at a first bit rate, while the second plurality of data packets may include data representing the same component of the media content channel transferred at a second bit rate different from the first bit rate.

After accessing the multicast packet stream, the data router may filter out from the multicast packet stream the second plurality of data packets associated with the second bit rate profile. For example, the data router may filter out the second plurality of data packets based on a preference of the client device (e.g., a preference received by the data router previously or as part of the present request) to access the component of the media content channel at the first bit rate rather than at the second bit rate. The data router may also replace a multicast destination address included within each data packet in the first plurality of data packets with a device destination address associated with the client device. After filtering out the second plurality of data packets and replacing the multicast destination address with the device destination address in the first plurality of data packets, the data router may route the multicast packet stream to the client device at the device destination address so that the end user can view and/or listen to the requested media content using the client device.

A multicast packet stream may correspond to a media content channel and may include a stream of data packets containing data representative of various components of the media content channel. For example, the multicast packet stream may correspond to a media content channel associated with television content such as a local television channel, a network television channel, an Internet television channel, a cable television channel, a satellite television channel, or any other suitable television channel. In other examples, the media content channel may be associated with audio-only media content such as by corresponding to an Internet radio station, a satellite radio station, or any other suitable audio-only programming. In yet other examples, the media content channel may be associated with on-demand video or audio content, pay-per-view media programming, video conferences, and/or any other source of continuous or discrete media content (e.g., media content programs) that multiple end users may wish to experience (e.g., view, listen to, etc.) at the same time.

End users may experience media content using various types of client devices. For example, end users may experience media content using large stationary devices included within a modern home theater system such as a high resolution television (e.g., high definition television ("HDTV"), 4K ultra high definition television ("UHDTV"), etc.) and/or a high fidelity surround sound system. Conversely, other end users may experience media content using smaller devices such as a mobile device (e.g., a smart phone, a tablet device, an e-reader, etc.), a personal computer, or another similar device with a relatively small screen and/or relatively low fidelity audio. While high-end systems such as those in a modern home theater system may be equipped to make efficient use of high-resolution versions of each of the various components of a media content channel (e.g., a high definition video profile, a high-fidelity audio profile, etc.), lower-end systems (e.g., smaller televisions, standard definition televisions, etc.) as well as mobile or personal devices (e.g., mobile phones, tablet devices, etc.) may not be equipped to make efficient use of such high-resolution versions of components of the media content channel. Instead, these smaller devices may only have resources (e.g., screen resolution, etc.) capable of presenting a lower-resolution profile of the media content channel and may receive no extra benefit from a higher-resolution profile. Thus, for example, a large HDTV may be well-suited to display a relatively high-definition video profile of a media content channel (e.g., a 5 Megabit per second ("Mbps") video profile), while the same high-definition video profile may be too much for the small screen of a mobile phone to make efficient use of, which may be better suited to display a relatively low-definition video profile of the media content channel (e.g., a 100 Kilobit per second ("Kbps") video profile).

To accommodate the various classes (e.g., sizes, capabilities, resources, etc.) of client devices that end users may use to experience a media content channel, a media content provider system may include within the multicast packet stream corresponding to the media content channel several pluralities of data packets each including data representing a component of the media content channel transferred at a particular bit rate. For example, as will be described in more detail below, a multicast packet stream may include a first plurality of data packets representing a video component of the media content channel transferred at 5 Mbps, a second plurality of data packets representing the same video component of the media content channel transferred at 100 Kbps, and one or more additional pluralities of data packets representing the same video component of the media content channel transferred at other bit rates (e.g., bit rates lower than 5 Mbps but higher than 100 Kbps). Similarly, the multicast packet stream may include one or more pluralities of data packets including data representing an audio component of the media content channel transferred at one or more different bit rates and/or any other suitable components of the media content channel transferred at one or more different bit rates. For example, the multicast packet stream may include a plurality of data packets including data representing a trick play component of the media content channel that includes only a subset of video frames of the media content channel and may be used to provide visual feedback when a user performs "rewind," "fast forward," or other trick play operations with respect to the media content channel.

Each plurality of data packets representing a component of the media content channel transferred at a particular bit rate may be referred to herein as a bit rate profile of the media content channel. For example, as will be described in more detail below, a multicast packet stream corresponding to a media content channel may include a plurality of video bit rate profiles, a plurality of audio bit rate profiles, and at least one trick play bit rate profile.

By filtering out one or more pluralities of data packets associated with bit rate profiles not requested by any client device and/or by replacing the multicast destination address with a device destination address in each of the data packets in pluralities of data packets that are requested by at least one client device before routing the multicast packet stream to the client device, several significant efficiencies may be gained by the data router and the local area network on which the data router is operating. For example, a mobile device (e.g., a mobile phone) may be used to access a media content channel and no other device on the local area network may have requested the media content channel. In this example, filtering out one or more pluralities of data packets associated with unrequested bit rate profiles (e.g., data packets including data representing components of the media content channel at higher bit rates than the mobile device can efficiently make use of with the mobile device's relatively modest video and audio resources) may significantly decrease the amount of traffic (e.g. the number of data packets) being routed on the local area network by the data router in comparison to if the data router were to route the entire multicast packet stream to the mobile phone with all of the bit rate profiles. In some examples, the routing load on the data router and/or the local area network may be reduced very significantly (e.g., by 80% or more). Similarly, the efficiency gained by filtering out lower bit rate profiles (e.g., when only a home theater system with more substantial video and audio resources has requested access to the media content channel) may also be significant, even if not as dramatic as filtering out higher bit rate profiles.

Moreover, efficiencies may be gained by replacing the multicast destination address with the device destination address in each data packet in the pluralities of packets that are not filtered out. By replacing the destination address, data packets may be routed directly to client devices at destination addresses uniquely associated with the client devices. In other words, the data packets may be routed as if they were unicast data packets rather than multicast data packets, which may generate significant efficiencies on local area networks particularly where the local area networks include wireless (e.g., WiFi) routing.

Beyond the efficiencies generated for the data router and the local area network generally, client devices communicatively coupled to the data router over the local area network may also receive efficiency benefits when packets are filtered and destination addresses are replaced as described herein. Specifically, client devices may only receive, and may only need to process, packets that are uniquely addressed to the client devices. Moreover, within the packets uniquely addressed to the client devices, the client devices will find only packets including data representing components of the media content channel transferred at bit rates that the client devices can actually use. Accordingly, the client devices do not have to process data packets associated with unrequested bit rate profiles to perform a filtering function that the client devices may otherwise need to perform if the client devices received the entire multicast packet stream unfiltered.

Various embodiments will now be described in more detail with reference to the figures. The disclosed methods and systems may also provide various other benefits that will be made apparent herein.

FIG. 1 illustrates an exemplary data router 100 configured to provide efficient routing of multicast media content at an end user premises. As shown, system 100 may include, without limitation, a data processing facility 102, a communication facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Storage facility 106 may maintain client device data 108 and operational data 110 generated and/or used by data processing facility 102 and/or communication facility 104. For example, client device data 108 may include data related to one or more client devices communicatively coupled to data router 100 such as one or more client devices that may communicate with one another and with other devices by way of a local area network associated with data router 100. As will be described in more detail below, client device data 108 may include any suitable information for each client device on the local area network such as one or more multicast destination addresses to which each client device is associated, one or more media content channels that each client device has requested to access, one or more unique device destination addresses to which each client device is associated, one or more preferences of each client device for bit rates at which various components of a media content channel should be received, etc. Operational data 110 may include any data related to operations performed by data router 100. For example, operational data 110 may include routing tables, request records, and other information for properly routing incoming packets to client devices on the local area network associated with data router 100.

Data processing facility 102 may perform one or more data processing operations such as receiving, processing, filtering, modifying, dropping, replicating, and/or routing incoming packets addressed to client devices on the local area network associated with data router 100. For example, as will be described in more detail below, data processing facility 102 may receive a request from a client device communicatively coupled to data router 100 by the local area network to access a multicast packet stream corresponding to a particular media content channel. Data processing facility 102 may access the multicast packet stream, which may include one or more pluralities of data packets associated with one or more bit rate profiles that may each include data representing a component (e.g., video, audio, etc.) of the media content channel transferred at different bit rates.

Data processing facility 102 may filter out from the multicast packet stream a particular plurality of data packets associated with a bit rate profile that no client device on the local area network has presently requested. For example, if the client device is a mobile phone and the request from the client device includes a request for relatively low-resolution bit rate profiles of video and audio components of the media content channel, data processing facility 102 may filter out from the multicast packet stream corresponding to the media content channel one or more additional pluralities of data packets associated with higher-resolution bit rate profiles that neither the mobile phone client device nor any other client device on the local area network has requested.

Data processing facility 102 may also replace a multicast destination address with a device destination address within each data packet in a plurality of data packets that was requested by a client device (e.g., by the mobile device client device) and, thus, was not filtered out of the multicast packet stream. For example, each data packet in the multicast packet stream may include a multicast destination address associated with the multicast media channel and/or with a multicast group to which the client device has subscribed. As an example, a specific multicast media channel (e.g., the Cable News Network ("CNN")) may be associated with one or more multicast destination addresses (e.g., a 32-bit multicast IP address permanently assigned to CNN such as 225.237.4.5, a 48-bit multicast MAC address that maps to the multicast IP address, etc.). Thus, while the client device may receive data packets addressed to CNN's multicast destination addresses by requesting the data packets from data router 100, data router 100 may replace at least one of the multicast destination addresses (e.g., the multicast MAC destination address) with a device destination address uniquely associated with the client device such that the data packets associated with CNN may be directly addressed to the client device. Data processing facility 102 may perform any other suitable operations as may serve a particular implementation.

Communication facility 104 may perform any suitable communication operations for proper functionality of data router 100. For example, as will be described in more detail below, communication facility 104 may communicate with a media content provider system external to the local area network associated with data router 100 to access media content from the media content provider system. After requesting and/or receiving media content from the media content provider system, communication facility 104 may operate in cooperation with data processing facility 102 to process received data packets, such as by providing the received data packets to data processing facility 102 for processing by data processing facility 102 as described herein, after which communication facility 104 may receive processed data packets from data processing facility 102 and route the processed data packets to one or more client devices on the local area network. The operations performed by data processing facility 102 and communication facility 104 within data router will be described in more detail below with reference to specific embodiments of data router 100.

Figure 2:
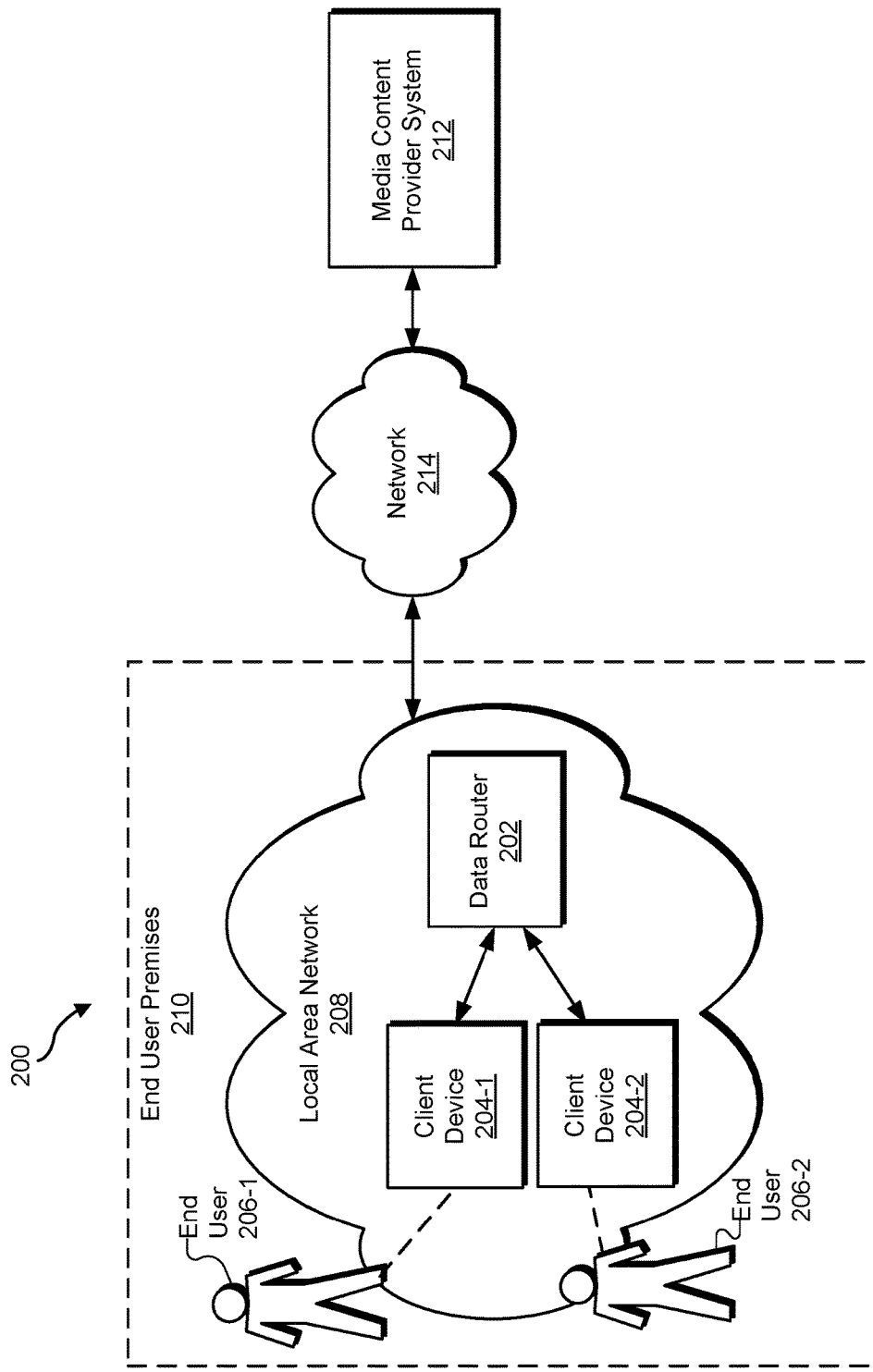
FIG. 2 illustrates an exemplary configuration in which an embodiment of the data router of FIG. 1 provides efficient routing of multicast media content at an end user premises according to principles described herein.

FIG. 2 illustrates an exemplary configuration 200 in which a data router 202 provides efficient routing of multicast media content to one or more client devices on a local area network at an end user premises. Specifically, as shown in FIG. 2, data router 202 may be communicatively coupled with client devices 204 (e.g., client devices 204-1 and 204-2), which may be associated with end users 206 (e.g., end users 206-1 and 206-2, respectively). Client devices 204 may be communicatively coupled to data router 202 by local area network 208, which may be associated with an end user premises 210, where end users 206 may be located. As shown, data router 202 and client devices 204 may also be communicatively coupled to a media content provider system 212 through local area network 208 and a network 214. Each of the components of configuration 200 will now be described in detail.

Data router 202 may implement data router 100, which was described above in relation to FIG. 1. As will be described in more detail below, data router 202 may receive one or more requests from one or more of client devices 204 to access one or more multicast packet streams corresponding to media content channels. For example, data router 202 may receive a first request from client device 204-1 to access a multicast packet stream corresponding to the CNN media content channel. Data router 202 may also receive a second request from client device 204-2 to access a multicast packet stream corresponding to the National Broadcasting Company ("NBC") media content channel. In response, data router 202 may access the multicast packet streams corresponding to CNN and/or NBC from media content provider system 212, process data packets within the multicast packet streams as described in more detail below, and route the multicast packet streams to the respective client device 204 that requested the multicast packet stream.

Client devices 204 may be used by end users 206 to access and playback media content received from media content provider system 212. To this end, client devices 204 may each include or be implemented by any suitable communication device such as by a mobile or wireless device (e.g., a smartphone and/or a tablet device), a personal computer, a set-top box device, a personal digital assistant device, a gaming device, a television device, a set-top device, a home audio device, and/or any other suitable client device configured to facilitate receiving and/or playback of media content.

In certain examples, client devices 204 may be configured to allow end users 206 to select respective media content channels that end users 206 wish to experience. In response to direction from end users 206, client devices 204 may send requests to data router 202 to access the multicast packet streams corresponding to the media content channels selected by end users 206. For example, client device 204-1 may send a request to receive a multicast packet stream corresponding to CNN, and client device 204-2 may send a request to receive a multicast packet stream corresponding to NBC. A request to access a multicast packet stream corresponding to a media content channel may include a multicast destination address (e.g., a multicast IP destination address and/or a multicast MAC destination address) associated with the media content channel.

In certain examples, client devices 204 may also send other information to data router 202, either as part of the requests to receive the multicast packet streams or separately (e.g., at some point in time prior to sending the requests such as when client devices 204 initially connect to local area network 208). For example, each of client devices 204 may send data router 202 a device destination address uniquely associated with the client device (e.g., a device destination address uniquely associated with client device 204-1 and a device destination address uniquely associated with client device 204-2). Additionally, each of client devices 204 may communicate to data router 202 a preference of the client device to access a component of one or more media content channels at a particular bit rate.

For example, client device 204-1 may be a set-top box associated with a large HDTV in a modern home theater configuration. Accordingly, client device 204-1 may indicate to data router 202 a preference to receive data representing video and/or audio components of the CNN media content channel transferred at a relatively high bit rate. Conversely, client device 204-2 may be a mobile phone with a relatively small screen and basic audio configuration. Accordingly, client device 204-2 may indicate to data router 202 a preference to receive data representing video and/or audio components of the NBC media content channel transferred at a relatively low bit rate.

In some examples, the preferences to receive data representing the components of the media content channels transferred at particular bit rates (e.g., relatively high bit rates for client device 204-1 and relatively low bit rates for client device 204-2) may be associated with preferences to receive one or more particular bit rate profiles of the components of the media content channel by default (e.g., when the bit rate profile is available within the multicast packet stream and/or when client devices 204 are successfully receiving and processing the packets being received without a threshold percentage of packets being dropped). For example, client device 204-1 may send, along with the request to access the media packet stream corresponding to CNN, a request to receive the video component of CNN at a 5 Mbps bit rate (i.e. to receive a 5 Mbps bit rate profile of the video component). Similarly, client device 204-2 may send, along with the request to access the media packet stream corresponding to NBC, a request to receive the video component of NBC at a 100 Kbps bit rate (e.g., to receive a 100 Kbps bit rate profile of the video component). Additionally or alternatively, client devices 204 may register preferences with data router 202 prior to the time of the request to access specific media content channels to receive video components of all media content channels at 5 Mbps (e.g., in the case of client device 204-1) or at 100 Kbps (e.g., in the case of client device 204-2) by default. As such, these bit rate profiles may be used by default unless the request to access a media content channel includes a request to override the registered bit rate preference. Similarly, client devices 204 may register analogous preferences for bit rates at which to receive audio components, trick play components, and/or other components of media content channels from data router 202.

In some examples, as described below, the preferred bit rate profile requested or registered by client device 204 may not be available and/or may not be provided by data router 202. For example, if data router 202 or one of client devices 204 (e.g., client device 204-1) detects that a percentage of packets above a predetermined threshold are not being processed by client device 204-1 (e.g., the packets are being dropped), client device 204-1 may request a lower bit rate profile of the component of the media content channel from data router 202 and/or data router 202 may send a lower bit rate profile of the component to client device 204-1 than indicated by the requested or registered bit rate preference of client device 204-1 as long as any conditions causing the high percentage of packets to be dropped persist.

End users 206 may be associated with client devices 204 and with end user premises 210 in any suitable way. For example, end users 206 may live in end user premises 210, which may represent a home where end users 206 reside. In other examples, end users 206 may work, attend school, patronize, or otherwise associate with end user premises 210, which may represent, respectively, a workplace of end users 206, a school of end users 206, a restaurant or coffee shop patronized by end users 206, or the like. Within end user premises 210, any person exerting control over any client device 204 (e.g., by powering on the client device 204, configuring the client device 204 to connect to data router 202, changing the media content channel being accessed by the client device 204, etc.) may be considered an end user 206 associated with the client device 204, regardless of whether the person owns, uses, or is otherwise associated with the client device 204 or end user premises 210.

Client devices 204, data router 202, and media content provider system 212 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, data router 202 and client devices 204 may be communicatively coupled with one another via local area network 208 (e.g., a local area network supported by data router 202), and local area network 208 may be communicatively coupled with media content provider system 212 by way of network 214. Local area network 208 may include any suitable networking equipment and utilize any suitable protocols. In some examples, local area network 208 may include wired (e.g., Ethernet, Multimedia over Coax Alliance ("MoCA")) connections between data router 202 and one or more of client devices 204. Additionally or alternatively, local area network 208 may include wireless connection based on an IEEE 802.11 standard ("Wi-Fi") or other wireless connections between data router 202 and one or more of client device 204. In some examples extension devices (e.g., Wi-Fi boosters, repeaters, extenders, etc.) may be employed within local area network 208.

Network 214 may include any provider-specific network (e.g., a cable or satellite carrier network or a mobile telephone network), the Internet, wide area network, or any other suitable network. Data may flow between local area network 208 and media content provider system 212 by way of network 214 using any suitable communication technologies, devices, media, and protocols as may serve a particular implementation. While only one network 214 is shown to interconnect local area network 208 and media content provider system 212 in FIG. 2, it will be recognized that devices connected to local area network 208 may communicate with media content provider system 212 by way of multiple interconnected networks as may serve a particular implementation.

Media content provider system 212 may be associated with (e.g., provided and/or managed by) a media content service provider (e.g., a network service provider, a cable service provider, a satellite service provider, an Internet service provider, etc.) and may be configured to provide media content to client devices 204. For example, media content provider system 212 may provide access (e.g., to subscribers of a media content service) to a variety of media content channels such as local television channels, network television channels, Internet television channels, cable television channels, satellite television channels, Internet and satellite radio stations, pay-per-view programs, video conferences, and other suitable media content channels. To this end, media content provider system 212 may receive a request from data router 202 (e.g., by way of network 214) to access a particular media content channel (e.g., CNN). In response, media content provider system 212 may transmit a multicast packet stream including data packets containing data representing various components (e.g., video, audio, etc.) of the media content channel transferred at one or more bit rates (i.e., associated with one or more bit rate profiles of each component).

Figure 3:
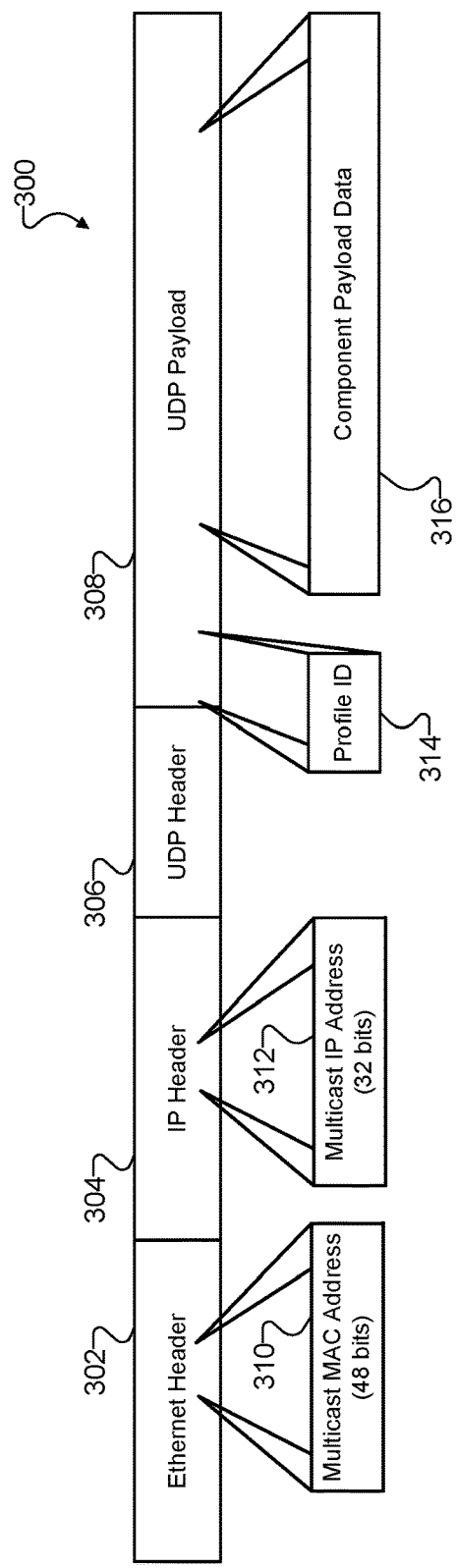
FIGS. 3-4 illustrate exemplary data packets that may be accessed by an embodiment of the data router of FIG. 1 and routed to one or more client devices according to principles described herein.
Figure 4:
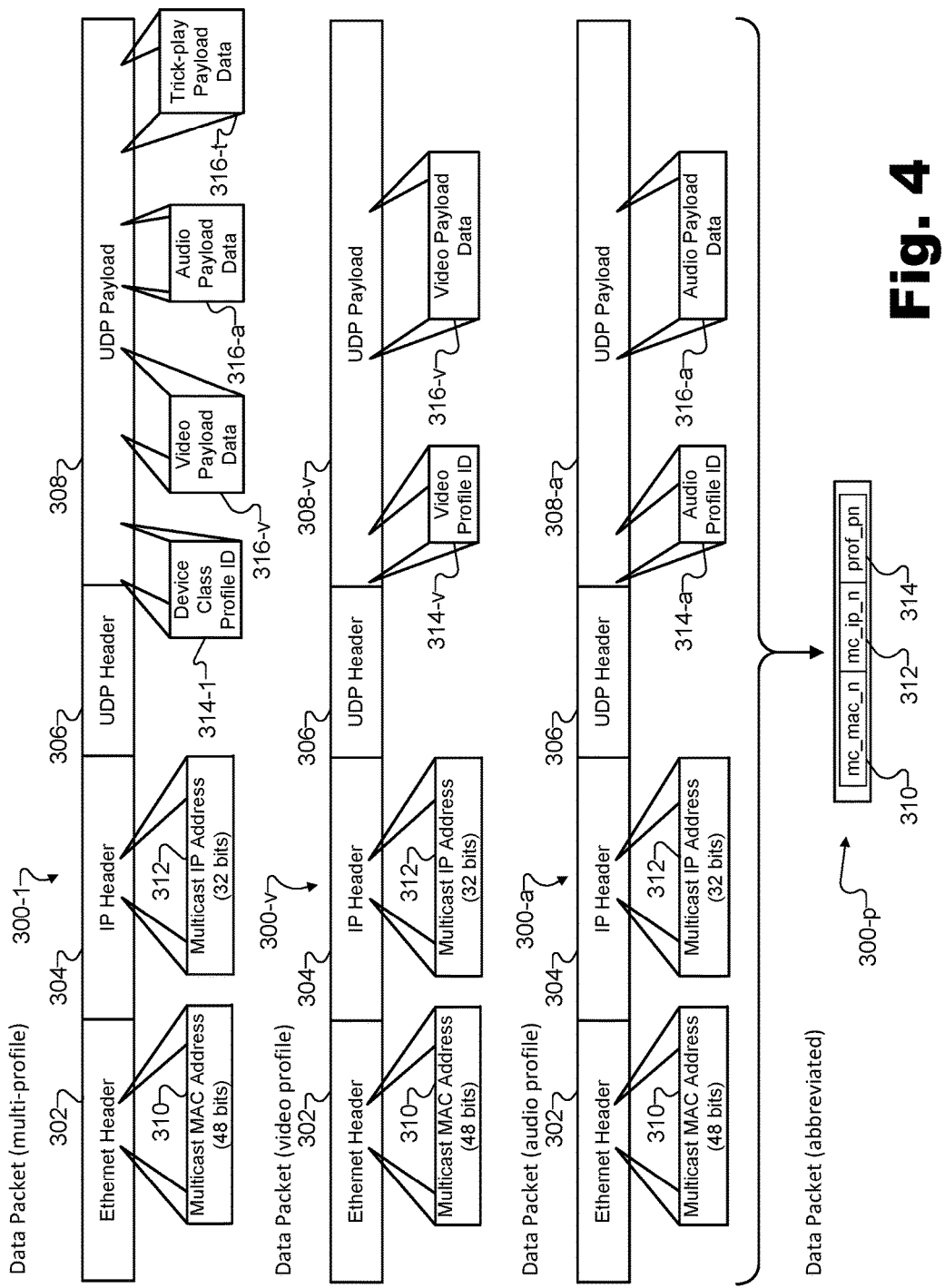

FIGS. 3-4 show exemplary multicast data packets that may be accessed (e.g., from media content provider system 212 of FIG. 2) by a data router (e.g., data router 202 of FIG. 2) and routed to one or more client devices (e.g., client devices 204 of FIG. 2). Specifically, as shown in FIG. 3, a data packet 300 may include an Ethernet header 302, an IP header 304, a UDP header 306, and a UDP payload 308. While data packet 300 may be represented as a UDP packet, any suitable standards or protocols for packet-based data transfer may be employed. For example, data packet 300 may be implemented as a TCP packet, where UDP header 306 may be replaced by a TCP header and UDP payload 308 may be replaced by a TCP payload. However, as will be explained below, the UDP protocol may be particularly well suited to processing data packets by a data router using the methods described herein.

Ethernet header 302 may include routing information corresponding to the data link layer (i.e. layer 2) of the Open Systems Interconnection model ("OSI Model") of networking known in the art. For example, Ethernet header 302 may include a 48-bit multicast MAC destination address 310 to indicate a multicast MAC destination address with which data packet 300 is associated. In other examples, Ethernet header 302 may include a 48-bit device MAC destination address (not shown) associated with a particular device to which data packet 300 is addressed. Additionally, Ethernet header 302 may include a 48-bit source MAC address, a 16-bit type or length field, a 16-bit priority/virtual local area network ("VLAN") field, and/or any other suitable fields that may serve a particular implementation (not explicitly illustrated in FIG. 3).

IP header 304 may include routing information corresponding to the network layer (i.e. layer 3) of the OSI Model. Specifically, in certain embodiments, IP header 304 may include a 32-bit multicast IP destination address 312 to indicate a multicast IP destination address with which data packet 300 is associated. In other examples, IP header 304 may include a 32-bit device IP address (not shown) to indicate a particular device to which data packet 300 is addressed. Additionally, IP header 304 may include a 4-bit version field, a 4-bit header length filed, an 8-bit type of service field, a 16-bit total length field, a 16-bit identification field, a 16-bit fragment offset field, an 8-bit time to live field, an 8-bit protocol field, a 16-bit header checksum field, a 32-bit source address, and any other suitable fields that may serve a particular implementation (not explicitly illustrated in FIG. 3).

UDP header 306 may include routing information corresponding to the transport layer (i.e. layer 4) of the OSI Model. Specifically, in certain embodiments, UDP header 306 may include a 16-bit source port, a 16-bit destination port, a 16-bit length, a 16-bit checksum, and/or any other suitable fields that may serve a particular implementation (not explicitly illustrated in FIG. 3).

UDP payload 308 may be a transport layer payload of data packet 300 and may include any suitable payload information that may serve a particular implementation. For example, UDP payload 308 may include additional headers associated with other layers (e.g., higher layers than layer 4) of the OSI Model. As shown in FIG. 3, UDP payload 308 may include one or more profile identifiers ("profile IDs") 314 and component payload data 316. Profile ID 314 may include any suitable number of bits (e.g., 8 bits) and may be located at the beginning of UDP Payload 308. Profile ID 314 may indicate one or more bit rate profiles that are included within component payload data 316. To this end, profile ID 314 may include any suitable information and may be formatted in any suitable way as may serve a particular embodiment.

For example, profile ID 314 may indicate that data packet 300 includes data associated with a plurality of bit rate profiles suitable for a particular class of device. Specifically, profile ID 314 may indicate that data representing bit rate profiles for multiple components of a media content channel (e.g., a video component, an audio component, a trick-play component, etc.) are each included within component payload data 316 and are transferred at a bit rate adapted for a relatively large-sized client device (e.g., a set-top box associated with a modern home theater system) that can make efficient use of data transferred at a relatively high bit rate. In other examples, profile ID 314 may indicate that component payload data 316 includes data representing multiple bit rate profiles each transferred at bit rates adapted for a medium-sized client device (e.g., a desktop computer), for a medium-to-small-sized client device (e.g., a tablet device), for a small-sized client device (e.g., a mobile phone), and/or for any other size or class of client devices that may serve a particular implementation.

In other examples, profile ID 314 may indicate that component payload data 316 includes data associated with a single component of a media content channel transferred at a particular bit rate. For example, profile ID 314 may indicate that component payload data 316 includes data associated with a video component of a media content channel transferred at a relatively high bit rate (e.g., 5 Mbps) or includes data associated with the video component of the media content channel transferred at a relatively low bit rate (e.g., 100 Kbps). In other examples, profile ID 314 may indicate that component payload data 316 includes data associated with an audio component of the media content channel transferred at a particular bit rate, a trick-play component of the media content channel transferred at a particular bit rate, or any other component of the media content channel transferred at a particular bit rate. When component payload data 316 only contains data representative of a single component of the media content channel (i.e., a single bit rate profile), a client device may select a plurality of bit rate profiles in order to access all of the components of the media content channel. Additionally, the client device may have flexibility to select bit rate profiles at appropriate bit rates for each component of the media content channel separately. For example, the client device may select to use a relatively high-fidelity audio bit rate profile of the media content channel while selecting to use a relatively low-resolution video bit rate profile of the media content channel.

To illustrate, FIG. 4 shows several examples of data packets 300, including a multi-profile data packet 300-1 that includes data representing multiple components of a media content channel each transferred at a bit rate suitable to a particular class or size of device indicated by device class profile ID 314-1, a video profile packet 300-v that includes data representing a video component of the media content channel transferred at a bit rate indicated by video profile ID 314-v, and an audio profile packet 300-a that includes data representing an audio component of the media content channel transferred at a bit rate indicated by audio profile ID 314-a. As shown, each of data packets 300 include Ethernet header 302 with multicast MAC destination address 310, IP header 304 with multicast IP destination address 312, and UDP header 306 as described above in reference to FIG. 3.

However, in FIG. 4, each data packet 300 differs in what is carried in UDP payload 308. Specifically, data packet 300-1 includes device class profile ID 314-1, which may include information indicating that payload data associated with multiple bit rate profiles (e.g. a video bit rate profile represented by video payload data 316-v, an audio bit rate profile represented by audio payload data 316-a, and a trick-play bit rate profile represented by trick-play payload data 316-t) is included within UDP payload 308. Device class profile ID 314-1 may also include information indicative of a device class (e.g., large devices, medium devices, small devices, etc.) for which the bit rates of the multiple bit rate profiles may be well-suited. For example, the "–1" modifier of device class profile ID 314-1 may indicate that the payload data included within data packet 300-1 is for a relatively small device that may only possess resources to make efficient use of component data transferred at relatively low bit rates. Conversely the "–5" in a data packet named data packet 300-5 (not shown) having a device class profile ID 314-5 may indicate that the payload data included within the data packet is for a relatively large device that may be able to make efficient use of component data transferred at relatively high bit rates.

In contrast to multi-profile data packet 300-1, data packets 300-v and 300-a illustrate single-profile data packets whose data payloads (i.e. UDP payloads 308-v and 308-a) may be associated only with a single bit rate profile (e.g. a video bit rate profile represented by video payload data 316-v in data packet 300-v, or an audio bit rate profile represented by audio payload data 316-a in data packet 300-a). Thus, profile IDs 314-v and 314-a in data packets 300-v and 300-a may indicate the particular component of the media content channel included within the data packet and/or a bit rate at which the data associated with the particular component is transferred. In other words, in contrast to data packet 300-1, which includes data associated with multiple bit rate profiles (e.g., video, audio, and trick-play bit rate profiles transferred at bit rates suitable for particular device classes), data packets 300-v and 300-a illustrate packets each associated with only one bit rate profile (e.g., a video bit rate profile in the case of data packet 300-v, and an audio bit rate profile in the case of data packet 300-a). As explained above, the single profile data packet implementation of data packets 300-v and 300-a may provide flexibility to client devices to select suitable bit rate profiles based on dynamic conditions (e.g., the quality of a network connection, how many packets are detected to have dropped, etc.). For example, multiple video bit rate profiles associated with pluralities of packets similar to data packet 300-*v* may be included in a multicast packet stream corresponding to a media content channel. A client device may register a preference to receive a particular video bit rate profile independent of the client device's preference for receiving an audio bit rate profile.

FIGS. 5-9 will illustrate various data packets similar to data packets 300 of FIGS. 3 and 4. To simplify the illustration of packets in these figures, FIG. 4 shows data packet 300-*p*, which uses an abbreviated packet format that will be employed in FIGS. 5-9. The name of data packet 300-*p* includes a "-p" indicating what type of bit rate profile is included within data packet 300-*p*. For example, if abbreviated data packets include payload data associated with multiple bit rate profiles (e.g. similar to data packet 300-1), the "-p" may use a number to indicate a device class for which the payload data is most suitable. Specifically, a data packet named data packet 300-1 may include relatively low-resolution video, audio, and trick-play payload data best suited to a mobile device, while a data packet named data packet 300-5 may include relatively high-resolution video, audio, and trick-play payload data best suited to stationary devices in a modern home theater configuration. Similarly, an abbreviated payload 314 indicates that a bit rate profile "_pn" may be carried by data packet 300-*p*. The "_pn" label may include a number (e.g., 1 for relatively low resolution up to 5 for relatively high resolution) that matches the name given to the packet.

In other examples, where abbreviated data packets include payload data associated with single bit rate profiles (e.g., similar to data packets 300-*v* and 300-*a*), the "-pn" may use a letter to indicate a component to which the payload data in the packet corresponds (e.g., "v" for a video component, "a" for an audio component, and "t" for a trick play component), as well as a number corresponding to a bit rate at which the bit rate profile to which the data packet corresponds is transferred. For example, a data packet named data packet 300-*v*1 may include data associated with a video bit rate profile transferred at a relatively low bit rate (e.g., 100 Kbps), while a data packet named data packet 300-*v*5 may include data associated with the video bit rate profile transferred at a relatively high bit rate (e.g., 5 Mbps). Again, the "_pn" label shown in the abbreviated payload 314 of a data packet may match the name of the packet and similarly indicate the bit rate profile contained in the UDP payload of the packet.

The abbreviated packet format of data packet 300-*p* also includes an abbreviated MAC destination address 310, which may include a number in place of the "_n" to indicate the multicast MAC destination address to which the data packet 300-*p* is addressed. For example, as used herein, "mc_mac_1" may represent a multicast MAC destination address associated with the CNN media content channel, while "mc_mac_2" may represent a multicast MAC destination address associated with the NBC media content channel. As will be described in more detail below, the multicast MAC destination address may be replaced with a device MAC destination address (e.g., a MAC address uniquely associated with a client device rather than with a media content channel). Thus, MAC destination address 310 may include a device MAC destination address formatted as "dev_mac_n," where "_n" represents a client device (e.g., "_1" for client device 204-1, "_2" for client device 204-2) to which the data packet is addressed. Similarly, abbreviated IP destination address 312 may be labeled "mc_ip_1" when the data packet contains a multicast IP destination address associated with the CNN media content channel, and labeled "mc_ip_2" when the data packet contains a multicast IP destination address associated with the NBC media content channel.

FIG. 5 (e.g., FIGS. 5A and 5B) illustrates exemplary multicast packet streams that correspond to media content channels and include exemplary data packets associated with exemplary bit rate profiles of the media content channels. The data packets of FIG. 5 are represented in the abbreviated format explained above in relation to data packet 300-*p* of FIG. 4. As shown, a multicast packet stream 502 and a multicast packet stream 512 both represent the same CNN media content channel. As such, data packets 504 of multicast packet stream 502 and data packets 514 of multicast packet stream 512 include identical multicast MAC destination addresses 506 corresponding to the multicast MAC destination address of the CNN media content channel, and identical multicast IP destination addresses 508 corresponding to the multicast IP destination address of the CNN media content channel.

However, data packets 504 (e.g., data packets 504-*v*1, 504-*v*2, 504-*v*3, 504-*a*1, and 504-*a*2) of FIG. 5A may each carry payload data representing a different, single bit rate profile of the CNN media content channel. Specifically, data packet 504-*v*1 may carry payload data representing a video component of the CNN media content channel transferred at a relatively low bit rate, data packet 504-*v*2 may carry payload data representing the video component of the CNN media content channel transferred at a relatively medium bit rate, and data packet 504-*v*3 may carry payload data representing the video component of the CNN media content channel transferred at a relatively high bit rate. Similarly, data packet 504-*a*1 may carry payload data representing an audio component of the CNN media content channel transferred at a relatively low bit rate, and data packet 504-*a*2 may carry payload data representing the audio component of the CNN media content channel transferred at a relatively high bit rate. As such, if a mobile client device requests access to multicast packet stream 502, the mobile client device may receive mobile profiles corresponding to data packets 504-*v*1 and 504-*a*1 as shown at the right side of FIG. 5A. If a stationary client device (e.g., a client device associated with a modern home theater system) requests access to multicast packet stream 502, the stationary device may receive stationary profiles corresponding to data packets 504-*v*3 and 504-*a*2. If no other client device has requested access to multicast packet stream 502, data packet 504-*v*2 may correspond to an unrequested bit rate profile and may safely be dropped to lighten the burden on the data router routing multicast packet stream 502.

Conversely, data packets 514 (e.g., data packets 514-1 through 514-5) of FIG. 5B may each carry payload data representing multiple bit rate profiles of the CNN media content channel each suited to a particular class of devices. Specifically, data packet 514-1 may carry payload data representing a video component and an audio component of the CNN media content channel each transferred at a relatively low bit rate, data packet 514-5 may carry payload data representing the video component and the audio component of the CNN media content channel each transferred at a relatively high bit rate, and data packets 514-2, 514-3, and 514-4 may carry payload data representing the video component and the audio component of the CNN media content channel each transferred at various medium bit rates. As such, if a mobile client device requests access to multicast packet stream 512, the mobile client device may receive a mobile profile corresponding to data packets 514-1 as shown at the right side of FIG. 5B. If a stationary client device (e.g., a client device associated with a modern home theater system) requests access to multicast packet stream 512, the stationary device may receive a stationary profile corresponding to data packets 514-5. If no other client device has requested access to multicast packet stream 512, data packets 514-2, 514-3, and 514-4 may correspond to unrequested bit rate profiles and may safely be dropped to lighten the burden on the data router routing multicast packet stream 512.

It will be understood that multicast packet streams 502 and 512 may include additional profiles not shown in FIG. 5. For example, multicast packet streams 502 and/or 512 may include additional video bit rate profiles, additional audio bit rate profiles, and one or more trick-play bit rate profiles not specifically illustrated in FIG. 5. Similarly, it will be understood that data packets 504 and 514 merely illustrate a few examples of data packets that may be included within multicast packet streams 502 and/or 512. Multicast packet streams 502 and/or 512 may include a continuous stream of data packets similar to data packets 504 and/or 514 to represent data associated with the CNN media content channel, which may provide a continuous stream of media content.

FIGS. 6-9 illustrate various examples of efficient routing of multicast media content within multicast packet streams by exemplary embodiments of data routers at end user premises. For example, in FIG. 6, data router 202 (described above in reference to FIG. 2) may access data packets 601 (e.g., data packets 601-$v$1, 601-$v$2, 602-$v$3, 601-$a$1, and 601-$a$2), which may be associated with multicast packet stream 604 (corresponding to the CNN media content channel) and may include payload data representing video and audio components of the media content channel as indicated by the names and labels associated with data packets 601 (see the explanation of the abbreviated data packet format described above in relation to data packet 300-$p$ in FIG. 4). Data router 202 may also access data packets 602 (e.g., data packets 602-$v$1, 602-$v$2, 602-$v$3, 602-$a$1, 602-$a$2), which may be associated with multicast packet stream 606 (corresponding to the NBC media content channel) and may similarly include payload data representing video and audio components of the media content channel as indicated by the names and labels associated with data packets 602.

It will be understood that while data packets 601 and 602 may each carry payload data representing a single component of a media content channel similar to data packets 300-$v$ and 300-$a$ in FIG. 4 and data packets 504 in FIG. 5A, in certain embodiments, data packets 601 and/or 602 may each carry payload data representing multiple components of the media content channel similar to data packet 300-1 in FIG. 4 and data packets 514 in FIG. 5B. It will also be understood that various embodiments may include additional components of the media content channels (e.g., trick-play components) and/or additional bit rate profiles for the video and/or audio components of the media content channels that are not explicitly illustrated in FIG. 6 for the sake of clarity. Additionally, it will be understood that each of data packets 601 and 602 may represent a plurality of similar data packets (e.g., associated with the same bit rate profile) that may be continuously received by data router 202 within multicast packet stream 604 and/or within multicast packet stream 606.

In some examples, data router 202 may access multicast packet streams 604 and 606 based on receiving a request from one or more client devices to access the multicast packet streams 604 and 606. For example, data router 202 may receive a request from client device 204-1 (described in more detail above in relation to FIG. 2) to access multicast packet stream 204 corresponding to the CNN media content channel. Data router 202 may also receive a request from client device 204-2 (also described above in relation to FIG. 2) to access multicast packet stream 206 corresponding to the NBC media content channel. Thus, as shown in FIG. 6, data router 202 may access multicast packet streams 204 and 206 (e.g., by requesting multicast packet streams 204 and 206 from a media content provider system such as media content provider system 212 in FIG. 2).

Figure 6:
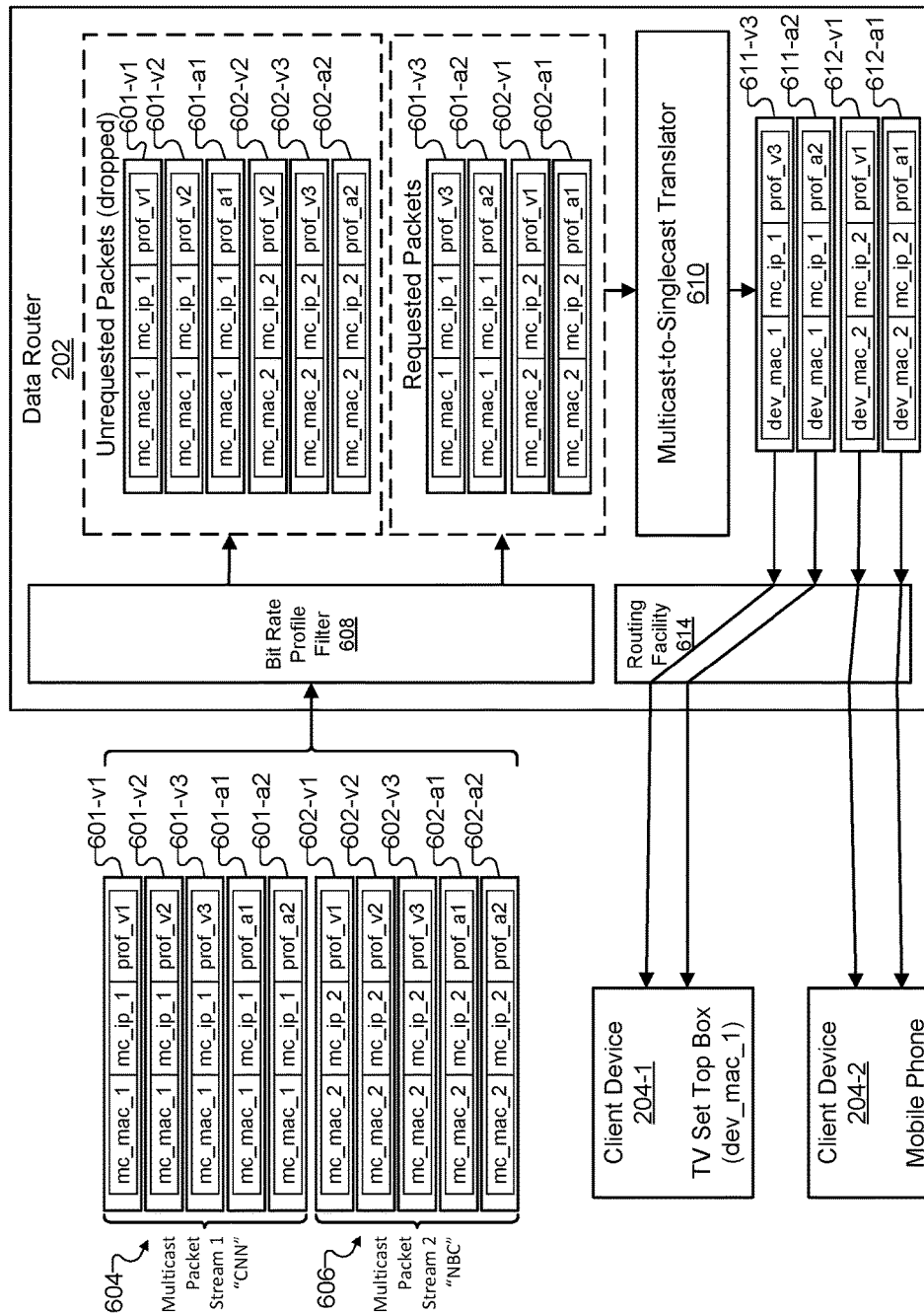
FIGS. 6-9 illustrate various examples of efficient routing of multicast media content within multicast packet streams by exemplary embodiments of data routers at end user premises according to principles described herein.

As shown in FIG. 6, as data router 202 accesses multicast packet streams 604 and 606 including data packets 601 and 602, data router 202 may provide data packets 601 and 602 to a bit rate profile filter 608, which may filter out from multicast packet streams 604 and 606, pluralities of data packets that are associated with bit rate profiles that no client device 204 has requested to access. Bit rate profile filter 608 may perform the filtering out of the data packets based on a preference of each client device to access particular components of a respective media content channel at one bit rate rather than at other available bit rates, as described above in relation to FIG. 2. Thus, for example, if client device 204-1 is a set top box associated with a stationary home theater system having a preference to receive data representing the components of multicast packet stream 604 transferred at relatively high bit rates, bit rate profile filter 608 may filter out all of the data packets within multicast packet stream 604 that are associated with slower bit rate profiles. As shown, bit rate profile filter 608 thus drops data packets 601-$v$1, 601-$v$2, and 601-$a$1 (hereinafter referred to as "unrequested data packets 601") because these data packets correspond to lower resolution bit rate profiles that client device 204-1 has not requested. Similarly, if client device 204-2 is a mobile phone having a preference to receive data representing the components of multicast packet stream 606 transferred at relatively low bit rates, bit rate profile filter 608 may filter out all of the data packets within multicast packet stream 606 that are associated with faster bit rate profiles. As shown, bit rate profile filter 608 thus drops data packets 602-$v$2, 602-$v$3, and 602-$a$2 (hereinafter referred to as the "unrequested data packets 602") since these data packets correspond to higher resolution bit rate profiles that client device 204-2 has not requested.

Bit rate profile filter 608 may perform the filtering out of unrequested data packets 601 and 602 in any suitable way. For example, each unrequested data packet 601 and 602 may include a profile identifier indicating that the data packet is associated with a particular bit rate profile and includes data representing a component of the media content channel transferred at a particular bit rate. As one specific example, unrequested data packet 601-$v$1 may include a profile identifier (e.g., similar to video profile ID 314-$v$ of FIG. 4) indicating that unrequested data packet 601-$v$1 is associated with a video bit rate profile of CNN and includes data representing the video component of CNN transferred at a relatively slow bit rate (e.g., 100 Kbps). Thus, bit rate profile filter 608 may perform the filtering out of unrequested data packets 601 and 602 by determining, based on the profile identifiers included within data packets 601-$v$3 and 601-$a$2 (hereinafter referred to as requested data packets 601) are not to be filtered out of multicast packet stream 604 (i.e. because requested data packets 601 have been requested by client device 204-1), and determining, based on the profile identifiers included within unrequested data packets 601 that unrequested data packets 601 are to be filtered out of multicast packet stream 604 (i.e. because unrequested data packets 601 have not been requested by client device 204-1 or any other client device). Similarly, bit rate profile filter 608 may filter out unrequested data packets 602 (i.e. while not filtering out data packets 602-v1 and 602-a1, hereinafter referred to as requested data packets 602) from multicast packet stream 606 based on the preference of client device 204-2 to receive the video and audio components of the NBC media content channel transferred at relatively low bit rates and based on the profile identifiers included within each requested and unrequested data packet 602.

Because the UDP protocol does not guarantee reliability (i.e. that data packets sent will be received at the destination), bit rate profile filter 608 may simply drop (i.e. not forward) data packets within multicast packet streams 604 and 606 corresponding to unrequested bit rate profiles. It will be understood that certain embodiments may employ other transport layer protocols (e.g., TCP) which may guarantee reliability. As such, bit rate profile filter 608 may perform additional steps beyond simply dropping data packets in implementations employing reliable transport layer protocols such as TCP.

Subsequent to filtering out data packets based on the preferences of client devices 204 to access the video and audio components of the respective media content channels at respective bit rates, each of requested data packets 601 and 602 may be processed by a multicast-to-singlecast translator 610. Multicast-to-singlecast translator 610 may replace a multicast destination address (e.g., a multicast MAC destination address associated with the media content channel) included within each requested data packet 601 and 602 with a device destination address associated (e.g., uniquely associated) with the respective client device 204 that requested the bit rate profile to which the data packet corresponds. For example, mc_mac_1 (a multicast MAC destination address associated with CNN) within requested data packets 601 may be replaced with dev_mac_1 (a device MAC destination address uniquely associated with client device 204-1) as shown in data packets 611 (e.g., data packets 611-v3 and 611-a2) at the output of multicast-to-singlecast translator 610. Similarly, mc_mac_2 (a multicast MAC destination address associated with NBC) within requested data packets 602 may be replaced with dev_mac_2 (a device MAC destination address uniquely associated with client device 204-2) as shown in data packets 612 (e.g., data packets 612-v1 and 612-a1) at the output of multicast-to-singlecast translator 610.

As shown in FIG. 6, the replacing of the multicast destination address with the device destination address within each data packet by multicast-to-singlecast translator 610 may include replacing the multicast MAC destination address in the Ethernet header of each data packet (e.g. multicast MAC destination address 310 in Ethernet header 302 illustrated in FIGS. 3 and 4 and represented in data packets 601 and 602 as "mc_mac_1" and "mc_mac_2," respectively) with a device MAC destination address uniquely associated with the client device (e.g., represented in data packets 611 and 612 as "dev_mac_1" and "dev_mac_2," respectively). Data router 202 may receive the device MAC destination address for each client device 204 in any suitable way. For example, data router 202 may receive the device MAC destination address for each client device 204 as part of the requests from client devices 204 to access multicast packet streams 604 and 606. In other examples, client devices 204 may register respective device MAC destination addresses with data router 202 when client devices 204 connect to a local area network associated with data router 202 (i.e. local area network 208 in FIG. 2) or at another time. Device MAC destination addresses uniquely associated with each client device 204 may be stored within data router 202 (e.g., within client device data 108 of storage facility 106 in FIG. 1).

As further shown in FIG. 6, the replacing of the multicast destination address with the device destination address within each data packet by multicast-to-singlecast translator 610 may also include leaving unaltered the multicast IP destination address in the IP header of each data packet (e.g. multicast IP destination address 312 in IP header 304 illustrated in FIGS. 3 and 4 and represented in data packets 601, 602, 611, and 612 as "mc_ip_1" and "mc_ip_2," respectively). In other words, rather than converting multicast data packets 601 and 602 into full unicast packets that include device MAC destination addresses and device IP destination addresses directed to a single client device, multicast-to-singlecast translator 610 may generate a hybrid multicast/unicast data packet (i.e. having a unicast-style device MAC destination address and a multicast IP destination address) referred to herein as a "singlecast" packet. Because multicast-to-singlecast translator 610 may only alter a destination address (e.g., the multicast MAC destination address) at the link layer (layer 2) while leaving unaltered a destination address (e.g., the multicast IP destination address) at the Internet layer (layer 3), data packets 611 and 612 may be easily and efficiently routed to client devices 204 at the link layer, but may appear to client devices 204 at the Internet and higher layers as expected. Accordingly, by replacing the multicast MAC destination address and leaving unaltered the multicast IP destination address, data router 202 may be more efficient while client devices 204 may not be aware of the filtering out of unrequested bit rate profiles or the replacing of multicast destination addresses.

As further shown in FIG. 6, a routing facility 614 may route a modified multicast packet stream 604 (i.e. including data packets 611) and a modified multicast packet stream 606 (i.e. including data packet 612) to client devices 204-1 and 204-2, respectively, at the respective device MAC destination address of each client device 204. Routing facility 614 may route the modified multicast packet streams 604 and 606 subsequent to the filtering out of unrequested data packets 601 and 602 and subsequent to the replacing of the multicast destination addresses with the device destination addresses in requested data packets 601 and 602.

In FIG. 6, bit rate profile filter 608 is illustrated as being upstream from multicast-to-singlecast translator 610. Thus, as illustrated, the replacing of the multicast destination address with the device destination address may be performed subsequent to the filtering out of unrequested data packets 601 and 602 from multicast packet streams 604 and 606. However, in certain embodiments, the filtering out of unrequested data packets 601 and 602 from multicast packet streams 604 and 606 by bit rate profile filter 608 may be performed subsequent to the replacing of the multicast destination address with the device destination address by multicast-to-singlecast translator 610.

Figure 7A:
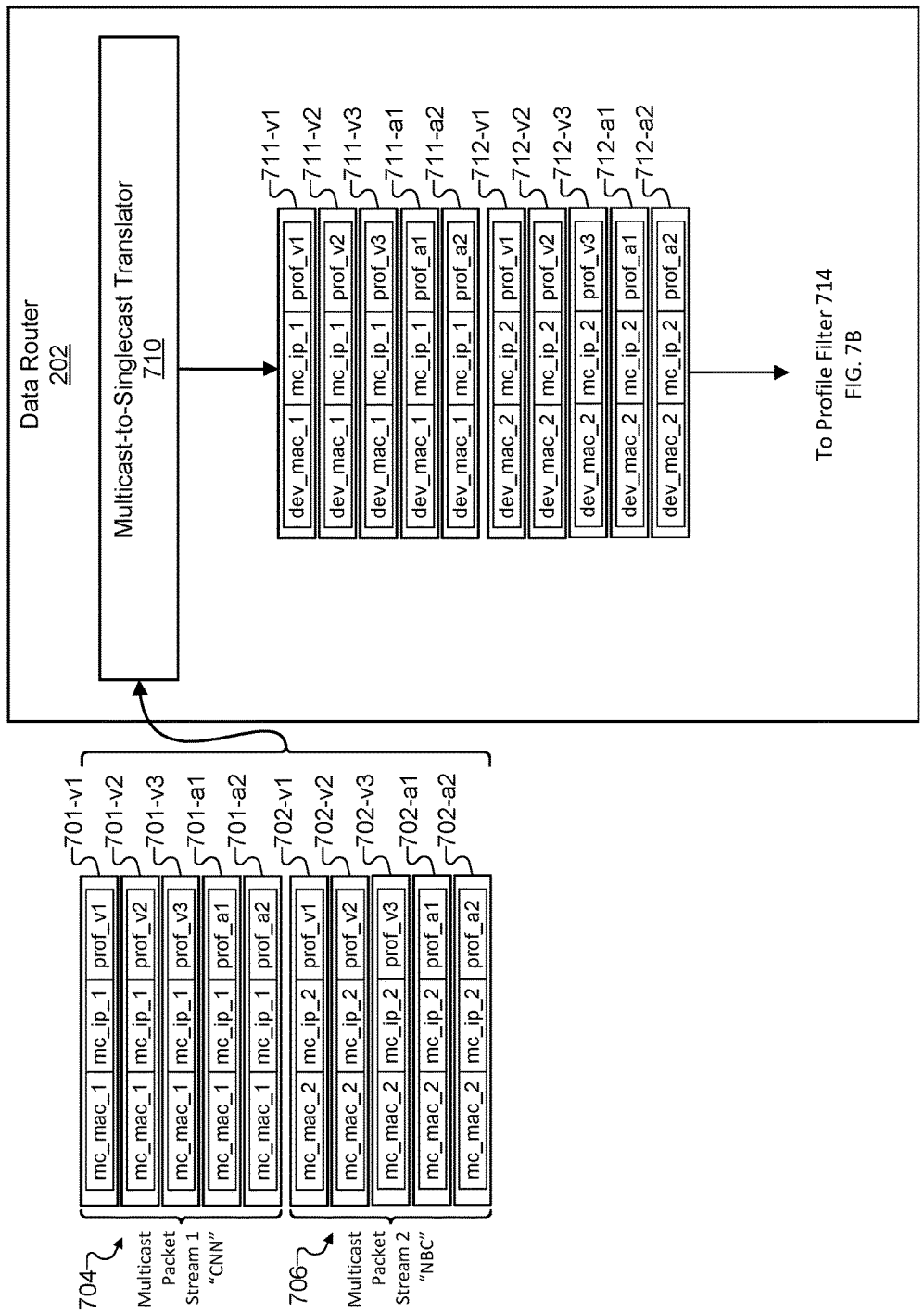
Figure 7B:
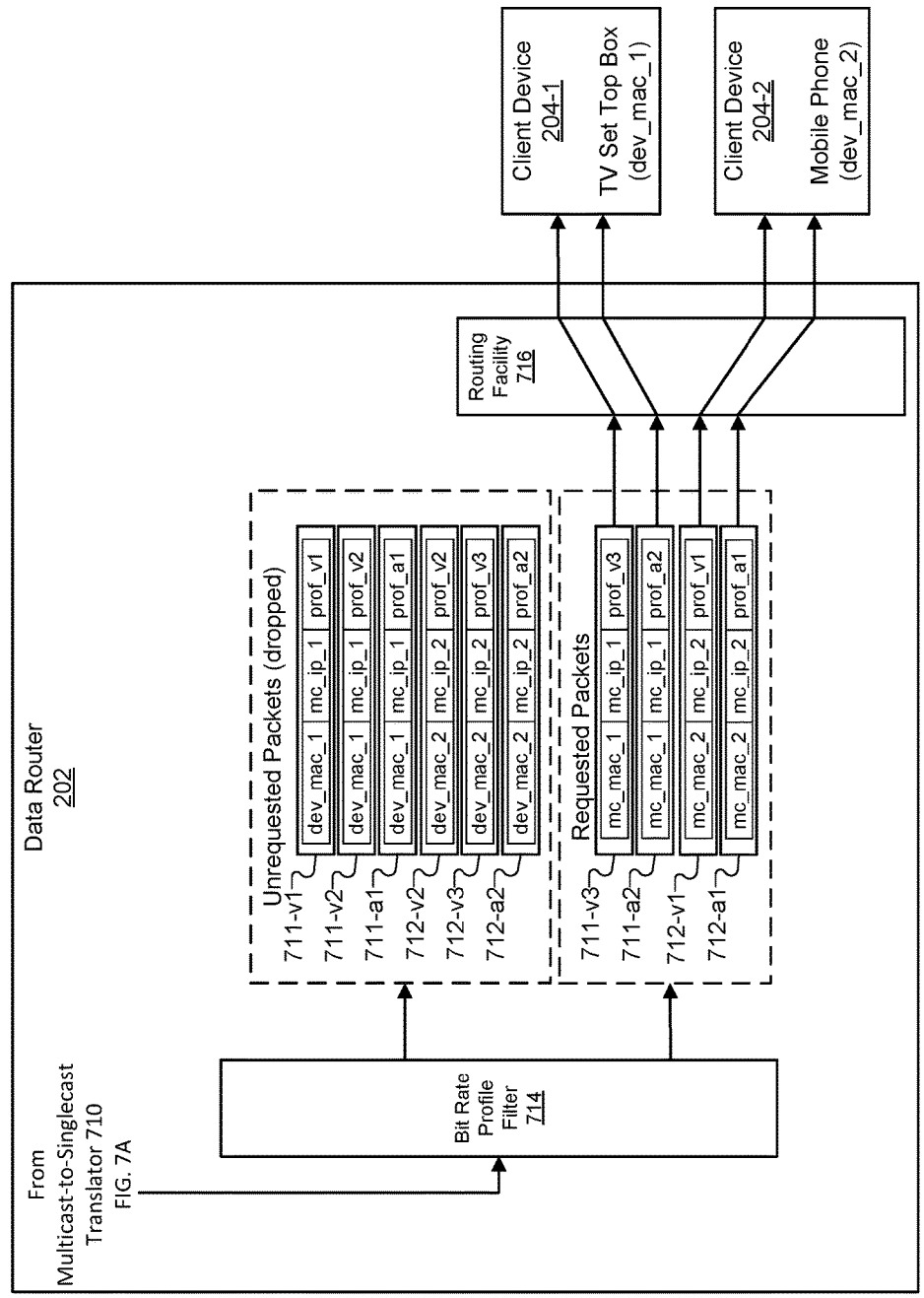

To illustrate, FIG. 7 (i.e. FIGS. 7A and 7B) illustrates data packets 701 and 702 associated with multicast packet streams 704 and 706, which correspond, respectively, to media content channels CNN and NBC. As in the implementation of FIG. 6, data router 202 may receive one or more requests (e.g., from client devices 204-1 and 204-2 in FIG. 7B) to access multicast packet streams 704 and 706. However, rather than initially filtering multicast packet streams 704 and 706 as data packets 701 and 702 stream into data router 202 as in FIG. 6, in FIG. 7, a multicast-to-singlecast translator 710 first replaces a multicast destination address included within each data packet 701 and 702 with a device destination address associated with the client device 204 that requested the multicast packet stream to which each data packet corresponds.

For example, as shown, multicast-to-singlecast translator 710 replaces the multicast MAC destination address associated with the CNN media content channel included within each data packet 701 (i.e. "mc_mac_1") with a device MAC destination address associated with client device 204-1 (i.e. "dev_mac_1") as shown in data packets 711 being output from multicast-to-singlecast translator 710. As shown, multicast-to-singlecast translator 710 may leave unaltered a multicast IP destination address associated with the CNN media content channel included within each data packet 701 (i.e. "mc_ip_1") such that each data packet 711 also includes the same multicast IP destination address after being output from multicast-to-singlecast translator 710. Similarly, as shown, multicast-to-singlecast translator 710 replaces the multicast MAC destination address associated with the NBC media content channel included within each data packet 702 (i.e. "mc_mac_2") with a device MAC destination address associated with client device 204-2 (i.e. "dev_mac_2") as shown in data packets 712 being output from multicast-to-singlecast translator 710. As shown, multicast-to-singlecast translator 710 may leave unaltered a multicast IP destination address associated with the NBC media content channel included within each data packet 702 (i.e. "mc_ip_2") such that each data packet 712 also includes the same multicast IP destination address after being output from multicast-to-singlecast translator 710.

Subsequent to the replacing of the multicast destination addresses with the device destination addresses by multicast-to-singlecast translator 710, data packets 711 and 712 may be filtered by a bit rate profile filter 714 in FIG. 7B. As shown, several data packets 711 that are associated with bit rate profiles that neither client device 204 requested (i.e. data packets 711-$v1$, 711-$v2$, 711-$a1$, hereinafter referred to as "unrequested data packets 711"), as well as several data packets 712 that are associated with bit rate profiles that neither client device 204 requested (i.e. data packets 712-$v2$, 712-$v3$, 712-$a2$, hereinafter referred to as "unrequested data packets 712"), are dropped by data router 202 by not forwarding unrequested data packets 711 and 712 to client devices 204. Other data packets corresponding to bit rate profiles requested and/or preferred by client devices 204 are not filtered out by bit rate profile filter 714. For example, data packets 711-$v3$ and 711-$a2$ (hereinafter referred to as "requested data packets 711") and data packets 712-$v1$ and 712-$a1$ (hereinafter referred to as "requested data packets 712") may be forwarded to a routing facility 716, which may route the modified multicast packet streams 704 and 706 (e.g., including requested packets 711 and requested packets 712, respectively) to client devices 204-1 and 204-2 at the respective device destination addresses of client devices 204, as shown.

In some examples, data router 202 may determine that a performance metric of data router 202 and/or one of client devices 204 fails to meet a predetermined threshold and will improve if the client device 204 receives a component of the media content channel at a different bit rate. For example, referring back to FIG. 6, data router 202 may determine that a performance metric of data router 202 and/or of client device 204-1 (i.e. the set top box associated with the modern home theater system) fails to meet a predetermined threshold and will improve if client device 204-1 receives the video and the audio components of the CNN media content channel at a lower bit rate. The performance metric may be any suitable metric related to a quality of a network connection between client device 204-1 and data router 202, an ability of data router 202 to process and route data packets to client device 204-1 at a suitable rate requested or preferred by client device 204-1, an ability of client device 204-1 to receive and process (i.e. render and/or playback) data corresponding to the media content channel within data packets sent by data router 202, and/or any other performance metric suitable to a particular implementation. For example, the performance metric may include a percentage of data packets associated with multicast packet stream 604 routed to client device 204-1 that have not been used by client device 204-1 (e.g., because the data packets were lost in transit to client device 204-1, dropped by client device 204-1, dropped by data router 202, or dropped by another intermediary device associated with local area network 208 (not shown in FIG. 2)).

In some examples, determining that the performance metric fails to meet the predetermined threshold may include data router 202 detecting that a percentage of data packets associated with multicast packet stream 604 that have not been used by client device 204-1 exceeds the predetermined threshold (e.g., 20%) and will improve if client device 204-1 receives one or more components (e.g., the video and/or audio components) of the CNN media content channel at a slower bit rate (e.g., to receive the video component at 3 Mbps rather than at 5 Mbps).

In the same or other examples, data router 202 may receive from client device 204-1 a request to receive the one or more video components at the slower bit rate (e.g., to receive the video component of the CNN media content channel at 3 Mbps rather than at 5 Mbps). For example, client device 204-1 may detect that a performance metric is below a predetermined threshold and, in response, may send a message to data router 202 to request to receive the one or more video components at the slower bit rate.

After data router 202 determines that the performance metric is below the predetermined threshold (e.g., by detecting in any suitable way that the performance metric is below the predetermine threshold or by receiving the request from client device 204-1 to receive the component of the media content channel at a different bit rate), data router 202 may switch from filtering out from multicast packet stream 604 certain data packets 601 (e.g., previously unrequested data packets 601-$v2$ and 601-$a1$) to filtering out from multicast packet stream 604 newly unrequested data packets 601-$v3$ and 601-$a2$. The switching from filtering out the previously unrequested data packets to the newly unrequested data packets may be based on the determining that the performance metric failed to meet the predetermined threshold (e.g., the percentage of packets routed to but not used by client device 204-1 exceeded 20%) and would improve if client device 204-1 received the component of the media content channel at a different bit rate (e.g., receiving the video and audio components of the CNN media content channel at slower bit rates). In other examples, the switching from filtering out the previously unrequested data packets to the newly unrequested data packets may be based on the request from client device 204-1 to receive the one or more components of the media content channel at the different bit rate.

Figure 8:
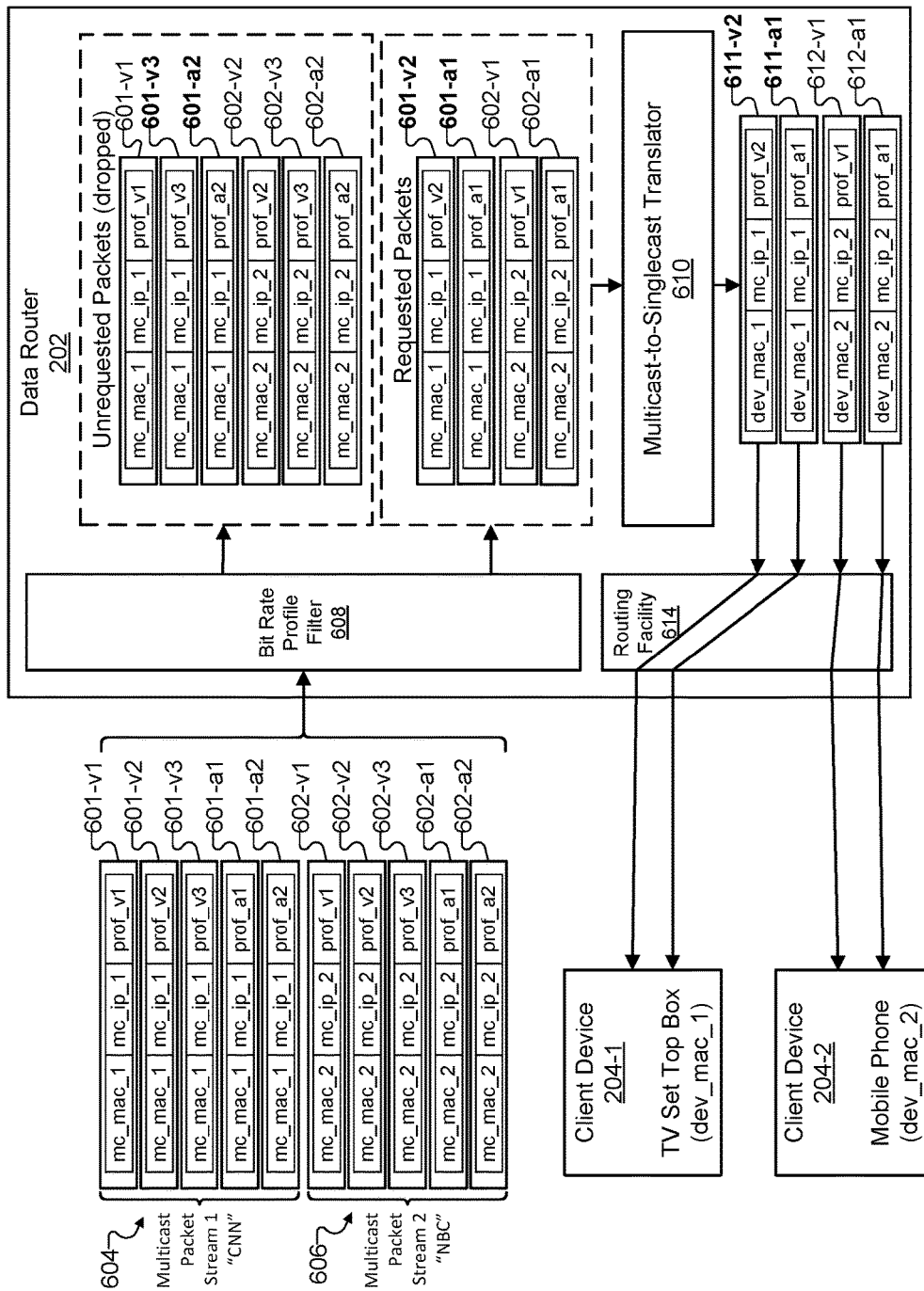

To illustrate, FIG. 8 is similar to FIG. 6, but shows in bolded emphasis that data router 202 is now filtering out newly unrequested data packets 601-$v3$ and 601-$a2$ rather than previously unrequested data packets 601-$v2$ and 601-$a1$, which now correspond to bit rate profiles that client device 204-1 is to receive. As shown in FIG. 8, after bit rate profile filter 608 performs filtering on data packets 601, multicast-to-singlecast translator 610 may replace the multicast destination address included within each requested data packet 601 (e.g., the multicast MAC destination address labeled "mc_mac_1") with a device MAC destination address associated with client device 204-1 (e.g., a device destination address uniquely associated with client device 204-1 and labeled "dev_mac_1," which may be stored within client device data 108 of storage facility 106 of data router 202, as described above in relation to FIG. 1). Subsequently, routing facility 614 may route the modified multicast packet stream 604 (e.g., now including data packets 611-v2 and 611-a1 rather than data packets 611-v3 and 611-a2) to client device 204-1 at the device destination address of client device 204-1 (e.g., "dev_mac_1"). In FIG. 8, multicast packet stream 606 may be processed by bit rate profile filter 608 and multicast-to-singlecast translator 610 and the modified multicast packet stream 606 routed by routing facility 614 to client device 204-2 as described above in relation to FIG. 6.

Referring back to FIG. 6, after data router 202 has accessed, processed, and routed multicast packet streams 604 and 606 to client devices 204-1 and 204-2 as described above, data router 202 may receive from one of client devices 204, an additional request to access, in place of the multicast packet stream corresponding to the media content channel the client device 204 is already accessing, a different multicast packet stream corresponding to a different media content channel. For example, if user 206-1 of client device 204-1 provides user input to client device 204-1 to change the media content channel accessed by client device 204-1 from CNN to NBC, data router 202 may receive from client device 204-1 an additional request to access multicast packet stream 606 corresponding to NBC in place of multicast packet stream 604 corresponding to CNN. Thus, data router 202 may access the different multicast packet stream corresponding to the different media content channel (e.g., multicast packet stream 606 corresponding to NBC), which, as illustrated, may also include pluralities of data packets associate with bit rate profiles of the different media content channel. In the example of FIG. 6, data router 202 was already accessing multicast packet stream 606 due to a request from client device 204-2. However, it is noted that if data router 202 was not already accessing multicast packet stream 606 due to a request from another client device, data router 202 may request (e.g., from media content provider system 212 of FIG. 2) access to multicast packet stream 606 to provide access to multicast packet stream 606 to client device 204-1.

Data router 202 may filter out from multicast packet stream 606, data packets associated with one or more bit rate profiles that client device 204-1 has not requested or registered a preference for, based on a preference of client device 204-1 to access one or more components of the NBC media content channel at a relatively high bit rate rather than at a lower bit rate. For example, just as client device 204-1 requested or registered a preference for data packets 601 corresponding to relatively high-resolution bit rate profiles (e.g., data packets 601-v3 and 601-v2), client device 204-1 may similarly access data packets 602 that correspond to the same relatively high bit rates. For example, based on the additional request to change the media content channel to NBC and/or based on a registered preference stored by data router 202, data router 202 may provide data packets 602-v3 and 602-a2 to client device 204-1.

Figure 9:
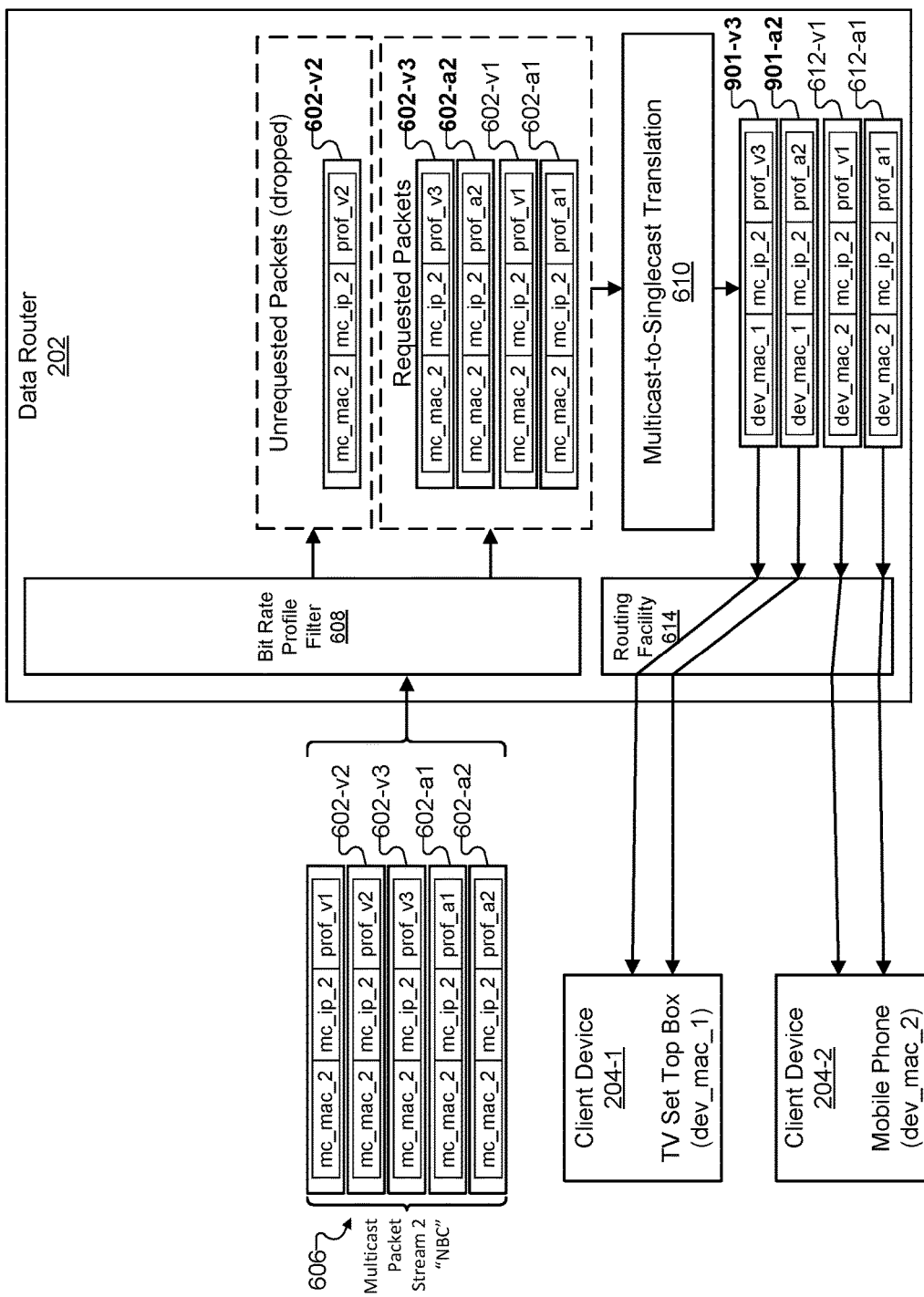

To illustrate, FIG. 9 is similar to FIG. 6, but shows that data router 202 may now only be accessing multicast packet stream 606 corresponding to the NBC media content channel, since no client device 204 may be currently requesting access to multicast packet stream 604 corresponding to the CNN media content channel. As shown, FIG. 9 shows in bolded emphasis that data router 202 may now be only filtering out unrequested data packets 602-v2, since the other data packets are all requested by one of client devices 204. Specifically, data packets 602-v3 and 602-a2 are now requested by client device 204-1 (e.g., due to the change of media content channel by user 206-1) while data packets 602-v1 and 602-a1 continue to be requested by client device 204-2.

While data packets associated with the same bit rate profile do not happen to be requested in the example of FIG. 9, it will be understood that two similar devices (e.g., two mobile phones) at the user premises associated with data router 202 may both request data packets associated with the same bit rate profile. For example, if a second mobile phone requested data router 202 to access the NBC media content channel, data router 202 may provide data packets such as data packets 602-v1 and 602-a1 to client device 204-2 as well as to the other mobile phone device. As such, it will be understood that data router 202 may replicate data packets within bit rate profile filter 608, multicast-to-singlecast translation 610, routing facility 614, or elsewhere within data router 202 to singlecast to each mobile phone a modified multicast packet stream corresponding to the NBC media content channel.

Upstream or downstream from bit rate profile filter 608, multicast-to-singlecast translation 610 may replace multicast destination addresses included within each requested data packet 602 with the device destination address associated with the client device. For example, multicast-to-singlecast translation 610 may replace the multicast MAC destination address of data packets 602-v3 and 602-a2 ("mc_mac_2") with a device MAC destination address uniquely associated with client device 204-1 ("dev_mac_1") as shown in data packets 901-v3 and 901-a2. Similarly, as described in FIG. 6, multicast-to-singlecast translation 610 may replace the multicast MAC destination address of data packets 602-v1 and 602-a1 ("mc_mac_2") with a device MAC destination address uniquely associated with client device 204-2 ("dev_mac_2") as shown in data packets 612-v1 and 612-a1. Subsequent to the filtering out of the data packet 602-v2 and subsequent to the replacing of the multicast destination addresses with the device destination addresses in the requested data packets 602, routing facility 614 may route data packets 901 to client device 204-1 at the device MAC destination address uniquely associated with client device 204-1 ("dev_mac_1"), and may route data packets 612 to client device 204-2 at the device MAC destination address uniquely associated with client device 204-2 ("dev_mac_2").

Figure 10:
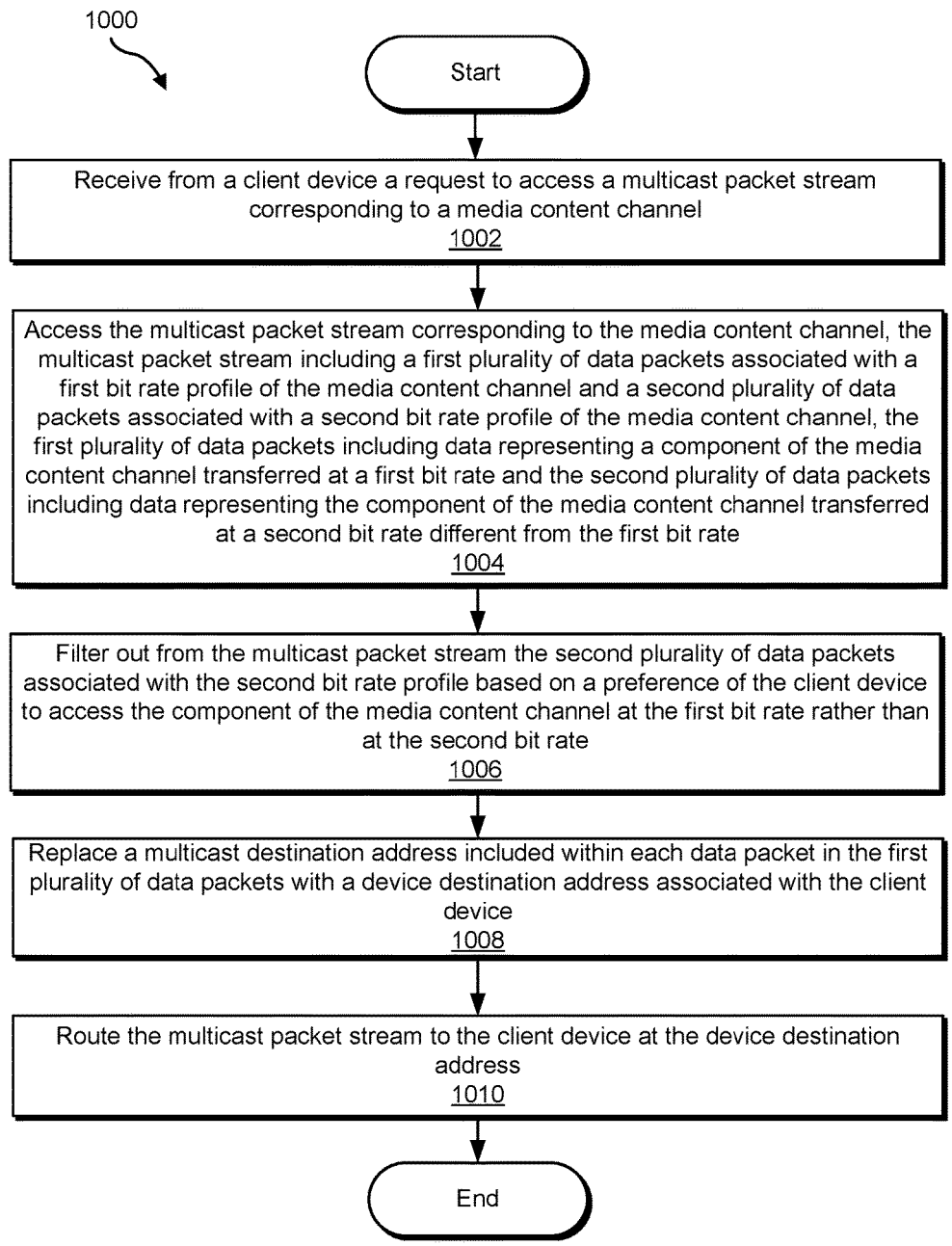
FIGS. 10-11 illustrate exemplary methods for efficient routing of multicast media content by data routers at end user premises according to principles described herein.

FIG. 10 illustrates an exemplary method 1000 of efficient routing of multicast media content by data routers at end user premises. While FIG. 10 illustrates exemplary operations according to one embodiment, other embodiments may omit, add to, reorder, and/or modify any of the operations shown in FIG. 10. One or more of the operations shown in FIG. 10 may be performed by data router 100 and/or any implementation thereof.

In operation 1002, a data router receives, from a client device communicatively coupled to the data router by a local area network, a request to access a multicast packet stream corresponding to a media content channel. Operation 1002 may be performed in any of the ways described herein.

In operation 1004, the data router accesses the multicast packet stream corresponding to the media content channel, the multicast packet stream including a first plurality of data packets associated with a first bit rate profile of the media content channel and a second plurality of data packets associated with a second bit rate profile of the media content channel. In operation 1004, the first plurality of data packets includes data representing a component of the media content channel transferred at a first bit rate and the second plurality of data packets includes data representing the component of the media content channel transferred at a second bit rate different from the first bit rate. Operation 1004 may be performed in any of the ways described herein.

In operation 1006, the data router filters out from the multicast packet stream the second plurality of data packets associated with the second bit rate profile. In operation 1006, the filtering out of the second plurality of data packets is based on a preference of the client device to access the component of the media content channel at the first bit rate rather than at the second bit rate. Operation 1006 may be performed in any of the ways described herein.

In operation 1008, the data router replaces a multicast destination address included within each data packet in the first plurality of data packets with a device destination address associated with the client device. Operation 1008 may be performed in any of the ways described herein.

In operation 1010, the data router routes the multicast packet stream to the client device at the device destination address. In some examples, operation 1010 may be performed subsequent to the filtering out of the second plurality of data packets and subsequent to the replacing of the multicast destination address with the device destination address in the first plurality of data packets. Operation 1010 may be performed in any of the ways described herein.

Figure 11:
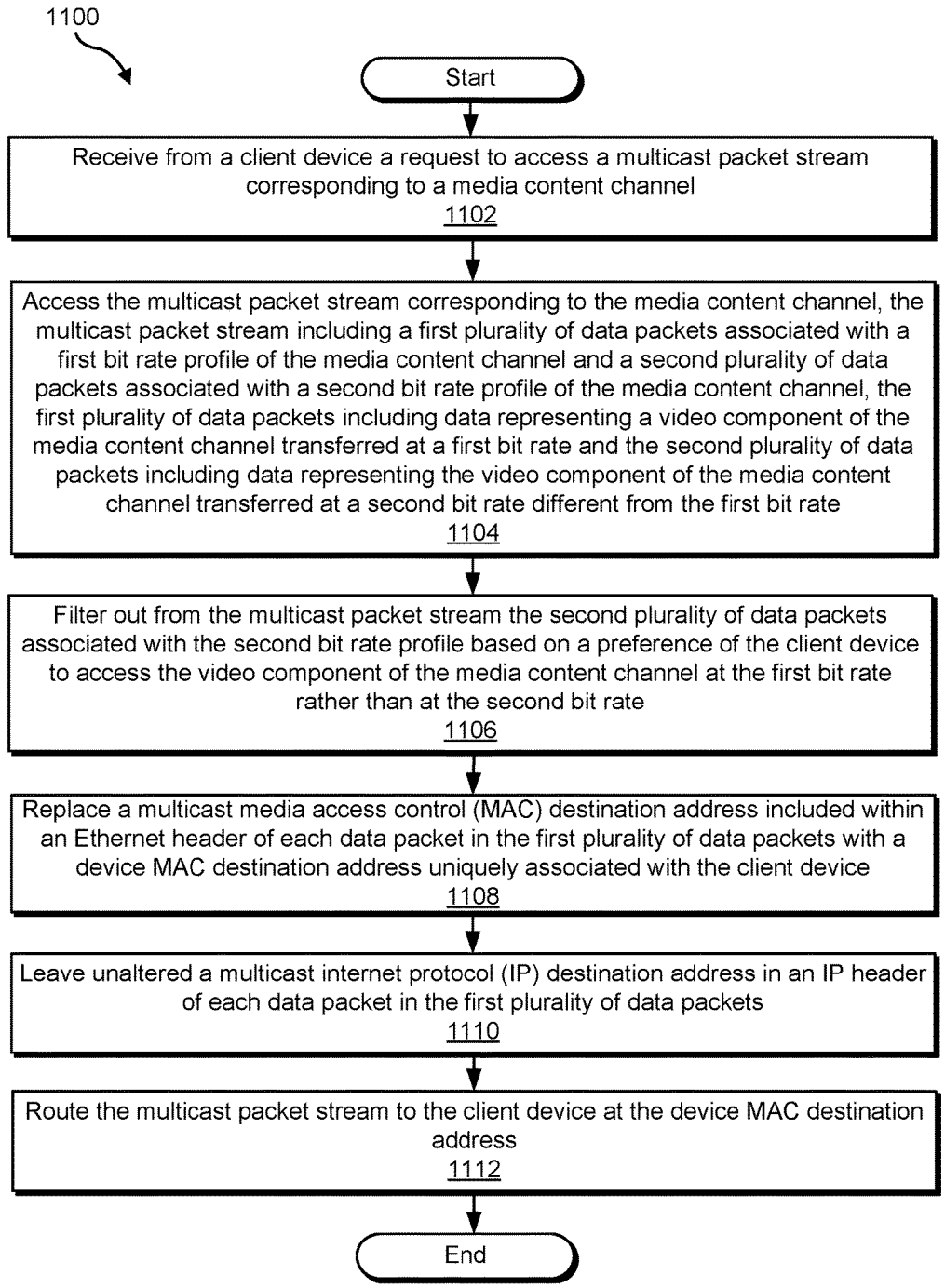

FIG. 11 illustrates another exemplary method 1100 of efficient routing of multicast media content by data routers at end user premises. While FIG. 11 illustrates exemplary operations according to one embodiment, other embodiments may omit, add to, reorder, and/or modify any of the operations shown in FIG. 11. One or more of the operations in FIG. 11 may be performed by system 100 and/or any implementation thereof.

In operation 1102, a data router may receive a request to access a multicast packet stream corresponding to a media content channel. For example, the data router may receive the request from a client device communicatively coupled to the data router by a local area network. Operation 1102 may be performed in any of the ways described herein.

In operation 1104, the data router accesses the multicast packet stream corresponding to the media content channel, the multicast packet stream including a first plurality of data packets associated with a first bit rate profile of the media content channel and a second plurality of data packets associated with a second bit rate profile of the media content channel. In operation 1004, the first plurality of data packets includes data representing a video component of the media content channel transferred at a first bit rate and the second plurality of data packets includes data representing the video component of the media content channel transferred at a second bit rate different from the first bit rate. Operation 1104 may be performed in any of the ways described herein.

In operation 1106, the data router filters out from the multicast packet stream the second plurality of data packets associated with the second bit rate profile. In operation 1106, the filtering out of the second plurality of data packets is based on a preference of the client device to access the video component of the media content channel at the first bit rate rather than at the second bit rate. Operation 1006 may be performed in any of the ways described herein.

In operation 1108, the data router replaces a MAC destination address included within an Ethernet header of each data packet in the first plurality of data packets with a device MAC destination address uniquely associated with the client device. Operation 1108 may be performed in any of the ways described herein.

In operation 1110, the data router leaves unaltered a multicast internet protocol (IP) destination address in an IP header of each data packet in the first plurality of data packets. Operation 1110 may be performed in any of the ways described herein.

In operation 1112, the data router routes the multicast packet stream to the client device at the device MAC destination address. In some examples, operation 1112 may be performed subsequent to the filtering out of the second plurality of data packets and subsequent to the replacing of the multicast MAC destination address with the device MAC destination address in the first plurality of data packets. Operation 1112 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
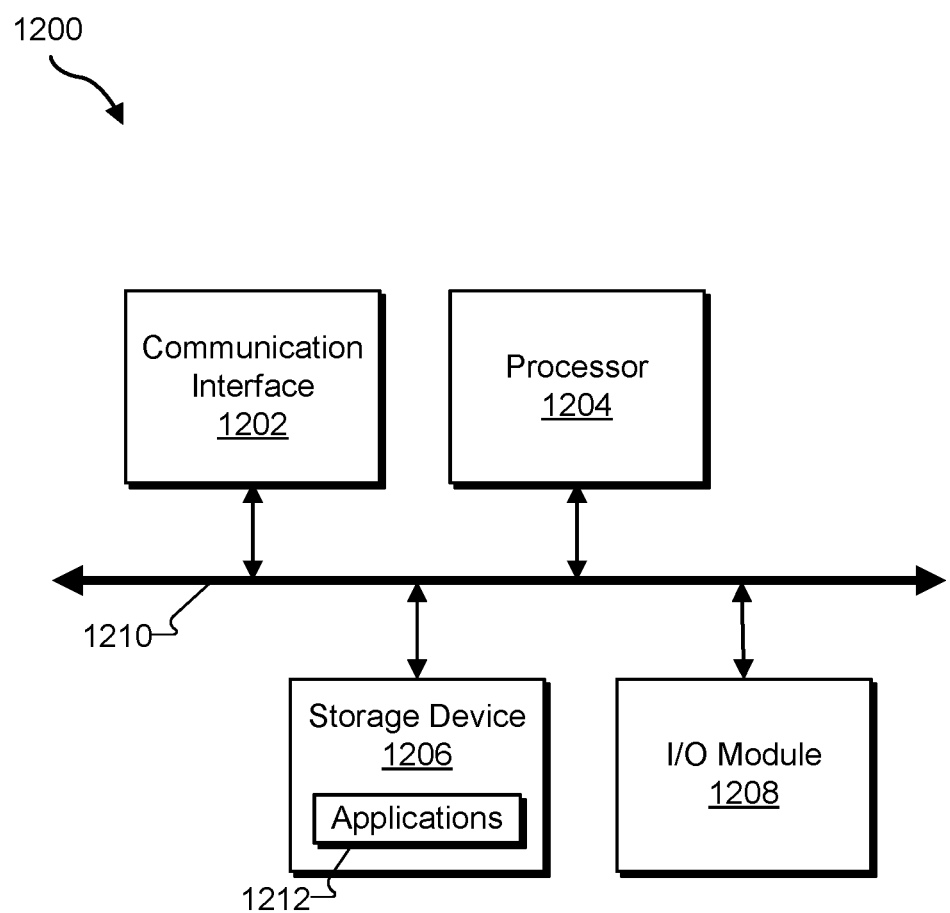
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with data processing facility 102 and/or communication facility 104. Likewise, storage facility 106 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

receiving, by a data router from a client device communicatively coupled to the data router by a local area network, a request to access a multicast packet stream corresponding to a media content channel;

identifying, by the data router, a preference of the client device to access a component of the media content channel at a first bit rate;

accessing, by the data router, the multicast packet stream corresponding to the media content channel, the multicast packet stream including a first plurality of data packets associated with a first bit rate profile of the media content channel and a second plurality of data packets associated with a second bit rate profile of the media content channel, the first plurality of data packets including data representing the component of the media content channel transferred at the first bit rate and the second plurality of data packets including data representing the component of the media content channel transferred at a second bit rate different from the first bit rate;

filtering out, by the data router from the multicast packet stream and based on the identified preference of the client device to access the component of the media content channel at the first bit rate, the second plurality of data packets associated with the second bit rate profile, the filtering out of the second plurality of data packets including dropping the second plurality of data packets to thereby decrease an amount of traffic being routed on the local area network by the data router;

replacing, by the data router, a multicast destination address included within each data packet in the first plurality of data packets with a device destination address associated with the client device; and routing, by the data router subsequent to the dropping of the second plurality of data packets and subsequent to the replacing of the multicast destination address with the device destination address in the first plurality of data packets, the multicast packet stream to the client device at the device destination address.

2. The method of claim 1, wherein the replacing of the multicast destination address with the device destination address is performed subsequent to the filtering out of the second plurality of data packets from the multicast packet stream.

3. The method of claim 1, further comprising:
determining, by the data router, that a performance metric of at least one of the data router and the client device fails to meet a predetermined threshold and will improve if the client device receives the component of the media content channel at the second bit rate rather than at the first bit rate;
switching, by the data router, from filtering out from the multicast packet stream the second plurality of data packets associated with the second bit rate profile to filtering out from the multicast packet stream the first plurality of data packets associated with first bit rate profile, the switching from the filtering out of the second plurality of data packets to the filtering out of the first plurality of data packets based on the determining that the performance metric fails to meet the predetermined threshold and will improve if the client device receives the component of the media content channel at the second bit rate rather than at the first bit rate;
replacing, by the data router, the multicast destination address included within each data packet in the second plurality of data packets with the device destination address associated with the client device; and
routing, by the data router subsequent to the filtering out of the first plurality of data packets and subsequent to the replacing of the multicast destination address with the device destination address in the second plurality of data packets, the multicast packet stream to the client device at the device destination address.

4. The method of claim 3, wherein:
the performance metric comprises a percentage of data packets associated with the multicast packet stream routed to the client device that have not been used by the client device; and
the determining that the performance metric fails to meet the predetermined threshold includes detecting that the percentage of data packets associated with the multicast packet stream routed to the client device that have not been used by the client device exceeds the predetermined threshold and will improve if the client device receives the component of the media content channel at the second bit rate rather than at the first bit rate.

5. The method of claim 1, further comprising:
receiving, by the data router from the client device, a request to receive the component of the media content channel at the second bit rate rather than at the first bit rate;
switching, by the data router, from filtering out from the multicast packet stream the second plurality of data packets associated with the second bit rate profile to filtering out from the multicast packet stream the first plurality of data packets associated with first bit rate profile, the switching from the filtering out of the second plurality of data packets to the filtering out of the first plurality of data packets based on the request to receive the component of the media content channel at the second bit rate rather than at the first bit rate;

replacing, by the data router, the multicast destination address included within each data packet in the second plurality of data packets with the device destination address associated with the client device; and
routing, by the data router subsequent to the filtering out of the first plurality of data packets and subsequent to the replacing of the multicast destination address with the device destination address in the second plurality of data packets, the multicast packet stream to the client device at the device destination address.

6. The method of claim 1, wherein the component of the media content channel represented by the data included in the first plurality of data packets and by the data included in the second plurality of data packets comprises at least one of:
a video component of the media content channel,
an audio component of the media content channel, and
a trick play component of the media content channel.

7. The method of claim 6, wherein:
the data included in the first plurality of data packets representing the component of the media content channel represents the video component of the media content channel, the audio component of the media content channel, and the trick play component of the media content channel; and
the data included in the second plurality of data packets representing the component of the media content channel represents the video component of the media content channel, the audio component of the media content channel, and the trick play component of the media content channel.

8. The method of claim 1, wherein:
the component of the media content channel represented by the data included in the first plurality of data packets and by the data included in the second plurality of data packets comprises a video component of the media content channel; and
the multicast packet stream further includes a first plurality of audio data packets associated with a first audio bit rate profile of the media content channel and a second plurality of audio data packets associated with a second audio bit rate profile of the media content channel, the first plurality of audio data packets including data representing an audio component of the media content channel transferred at a first audio bit rate and the second plurality of audio data packets including data representing the audio component of the media content channel transferred at a second audio bit rate different from than the first audio bit rate;
the method further comprising:
identifying, by the data router, a preference of the client device to access the audio component of the media content channel at the first audio bit rate rather than at the second audio bit rate;
filtering out, by the data router from the multicast packet stream and based on the identified preference of the client device to access the component of the media content channel at the first audio bit rate, the second plurality of audio data packets associated with the second audio bit rate profile, the filtering out of the second plurality of audio data packets including dropping the second plurality of audio data packets to thereby further decrease the amount of traffic being routed on the local area network by the data router;
replacing, by the data router, the multicast destination address included within each data packet in the first plurality of audio data packets with the device destination address associated with the client device; and routing, by the data router subsequent to the dropping of the second plurality of audio data packets and subsequent to the replacing of the multicast destination address with the device destination address in the first plurality of audio data packets, the multicast packet stream to the client device at the device destination address.

9. The method of claim 1, wherein:
each data packet in the first plurality of data packets associated with the first bit rate profile of the media content channel includes a profile identifier indicating that each data packet in the first plurality of data packets is associated with the first bit rate profile and includes the data representing the component of the media content channel transferred at the first bit rate;
each data packet in the second plurality of data packets associated with the second bit rate profile of the media content channel includes a profile identifier indicating that each data packet in the second plurality of data packets is associated with the second bit rate profile and includes the data representing the component of the media content channel transferred at the second bit rate; and
the filtering out of the second plurality of data packets from the multicast packet stream comprises
determining, based on the profile identifiers included within each data packet in the first plurality of data packets, that the first plurality of data packets are not to be filtered out of the multicast packet stream, and
determining, based on the profile identifiers included within each data packet in the second plurality of data packets, that the second plurality of data packets are to be filtered out of the multicast packet stream.

10. The method of claim 1, wherein:
the multicast destination address is a multicast media access control (MAC) destination address included in an Ethernet header of each data packet in the first plurality of data packets;
the device destination address is a device MAC destination address uniquely associated with the client device; and
the replacing of the multicast destination address with the device destination address within each data packet comprises:
replacing the multicast MAC destination address in the Ethernet header of each data packet with the device MAC destination address uniquely associated with the client device; and
leaving unaltered a multicast internet protocol (IP) destination address in an IP header of each data packet.

11. The method of claim 1, further comprising:
receiving, by the data router from the client device, an additional request to access, in place of the multicast packet stream corresponding to the media content channel, a different multicast packet stream corresponding to a different media content channel;
accessing, by the data router, the different multicast packet stream corresponding to the different media content channel, the different multicast packet stream including a third plurality of data packets associated with a third bit rate profile of the different media content channel and a fourth plurality of data packets associated with a fourth bit rate profile of the different media content channel, the third plurality of data packets including data representing a component of the different media content channel transferred at the first bit rate and the fourth plurality of data packets including data representing the component of the different media content channel transferred at the second bit rate;
filtering out, by the data router from the multicast packet stream and based on the identified preference of the client device to access the component of the media content channel at the first bit rate, the fourth plurality of data packets associated with the fourth bit rate profile, the filtering out of the fourth plurality of data packets including dropping the fourth plurality of data packets to thereby further decrease the amount of traffic being routed on the local area network by the data router;
replacing, by the data router, a multicast destination address included within each data packet in the third plurality of data packets with the device destination address associated with the client device; and
routing, by the data router subsequent to the dropping of the fourth plurality of data packets and subsequent to the replacing of the multicast destination address with the device destination address in the third plurality of data packets, the different multicast packet stream to the client device at the device destination address.

12. The method of claim 1, embodied as computer-executable instructions on at least one non-transitory computer-readable medium.

13. A method comprising:
receiving, by a data router from a client device communicatively coupled to the data router by a local area network, a request to access a multicast packet stream corresponding to a media content channel;
identifying, by the data router, a preference of the client device to access a video component of the media content channel at a first bit rate;
accessing, by the data router, the multicast packet stream corresponding to the media content channel, the multicast packet stream including a first plurality of data packets associated with a first bit rate profile of the media content channel and a second plurality of data packets associated with a second bit rate profile of the media content channel, the first plurality of data packets including data representing the video component of the media content channel transferred at the first bit rate and the second plurality of data packets including data representing the video component of the media content channel transferred at a second bit rate different from the first bit rate;
filtering out, by the data router from the multicast packet stream and based on the identified preference of the client device to access the video component of the media content channel at the first bit rate, the second plurality of data packets associated with the second bit rate profile, the filtering out of the second plurality of data packets including dropping the second plurality of data packets to thereby decrease an amount of traffic being routed on the local area network by the data router;
replacing, by the data router, a multicast media access control (MAC) destination address included within an Ethernet header of each data packet in the first plurality of data packets with a device MAC destination address uniquely associated with the client device;

leaving unaltered, by the data router, a multicast internet protocol (IP) destination address in an IP header of each data packet in the first plurality of data packets; and routing, by the data router subsequent to the dropping of the second plurality of data packets and subsequent to the replacing of the multicast MAC destination address with the device MAC destination address in the first plurality of data packets, the multicast packet stream to the client device at the device MAC destination address.

14. The method of claim 13, embodied as computer-executable instructions on at least one non-transitory computer-readable medium.

15. A data router comprising:

at least one physical computing device that:

receives, from a client device communicatively coupled to the data router by a local area network, a request to access a multicast packet stream corresponding to a media content channel;

identifies a preference of the client device to access a component of the media content channel at a first bit rate;

accesses the multicast packet stream corresponding to the media content channel, the multicast packet stream including a first plurality of data packets associated with a first bit rate profile of the media content channel and a second plurality of data packets associated with a second bit rate profile of the media content channel, the first plurality of data packets including data representing the component of the media content channel transferred at the first bit rate and the second plurality of data packets including data representing the component of the media content channel transferred at a second bit rate different from the first bit rate;

filters out, from the multicast packet stream and based on the identified preference of the client device to access the component of the media content channel at the first bit rate, the second plurality of data packets associated with the second bit rate profile by dropping the second plurality of data packets to thereby decrease an amount of traffic being routed on the local area network by the data router;

replaces a multicast destination address included within each data packet in the first plurality of data packets with a device destination address associated with the client device; and routes, subsequent to dropping the second plurality of data packets and subsequent to replacing the multicast destination address with the device destination address in the first plurality of data packets, the multicast packet stream to the client device at the device destination address.

16. The data router of claim 15, wherein the at least one physical computing device replaces the multicast destination address with the device destination address after the at least one physical computing device filters out the second plurality of data packets from the multicast packet stream.

17. The data router of claim 15, wherein the at least one physical computing device further:

determines that a performance metric of at least one of the data router and the client device fails to meet a predetermined threshold and will improve if the client device receives the component of the media content channel at the second bit rate rather than at the first bit rate;

switches from filtering out from the multicast packet stream the second plurality of data packets associated with the second bit rate profile to filtering out from the multicast packet stream the first plurality of data packets associated with first bit rate profile based on the determination that the performance metric fails to meet the predetermined threshold and will improve if the client device receives the component of the media content channel at the second bit rate rather than at the first bit rate;

replaces the multicast destination address included within each data packet in the second plurality of data packets with the device destination address associated with the client device; and routes, subsequent to filtering out the first plurality of data packets and subsequent to replacing the multicast destination address with the device destination address in the second plurality of data packets, the multicast packet stream to the client device at the device destination address.

18. The data router of claim 15, wherein the component of the media content channel represented by the data included in the first plurality of data packets and by the data included in the second plurality of data packets comprises at least one of:

a video component of the media content channel, an audio component of the media content channel, and a trick play component of the media content channel.

19. The data router of claim 15, wherein:

the component of the media content channel represented by the data included in the first plurality of data packets and by the data included in the second plurality of data packets comprises a video component of the media content channel;

the multicast packet stream further includes a first plurality of audio data packets associated with a first audio bit rate profile of the media content channel and a second plurality of audio data packets associated with a second audio bit rate profile of the media content channel, the first plurality of audio data packets including data representing an audio component of the media content channel transferred at a first audio bit rate and the second plurality of audio data packets including data representing the audio component of the media content channel transferred at a second audio bit rate different than the first audio bit rate;

the at least one physical computing device further:

identifies a preference of the client device to access the audio component of the media content channel at the first audio bit rate rather than at the second audio bit rate;

filters out, from the multicast packet stream and based on the identified preference of the client device to access the component of the media content channel at the first audio bit rate, the second plurality of audio data packets associated with the second audio bit rate profile by dropping the second plurality of audio data packets to thereby further decrease the amount of traffic being routed on the local area network by the data router;

replaces the multicast destination address included within each data packet in the first plurality of audio data packets with the device destination address associated with the client device; and routes, subsequent to dropping the second plurality of audio data packets and subsequent to replacing the multicast destination address with the device destination address in the first plurality of audio data packets, the multicast packet stream to the client device at the device destination address.

20. The data router of claim 15, wherein:

the multicast destination address is a multicast media access control (MAC) destination address included in an Ethernet header of each data packet in the first plurality of data packets;

the device destination address is a device MAC destination address uniquely associated with the client device; and the at least one physical computing device replaces the multicast destination address with the device destination address within each data packet by
  replacing the multicast MAC destination address in the Ethernet header of each data packet with the device MAC destination address uniquely associated with the client device; and
  leaving unaltered a multicast internet protocol (IP) destination address in an IP header of each data packet.

* * * * *